US008914313B2

(12) United States Patent
Wang et al.

(10) Patent No.: US 8,914,313 B2
(45) Date of Patent: Dec. 16, 2014

(54) CONFIDENCE BASED VEIN IMAGE RECOGNITION AND AUTHENTICATION

(75) Inventors: Jinjun Wang, San Jose, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 244 days.

(21) Appl. No.: 13/552,422

(22) Filed: Jul. 18, 2012

(65) Prior Publication Data

US 2014/0025607 A1 Jan. 23, 2014

(51) Int. Cl.
*G06F 15/18* (2006.01)

(52) U.S. Cl.
USPC .......... 706/12

(58) Field of Classification Search
None
See application file for complete search history.

(56) References Cited

U.S. PATENT DOCUMENTS 5,127,043 A * 6/1992 Hunt et al. .......... 379/88.02
6,041,133 A 3/2000 Califano et al.
7,680,748 B2 3/2010 Heisele et al.
7,769,209 B2 8/2010 Komura et al.
8,160,877 B1 * 4/2012 Nucci et al. .......... 704/246
2003/0061233 A1 3/2003 Manasse et al.
2003/0145002 A1 * 7/2003 Kleinberger et al. .......... 707/5
2009/0228411 A1 * 9/2009 Matsumoto et al. .......... 706/12
2010/0202670 A1 * 8/2010 Tian et al. .......... 382/118

OTHER PUBLICATIONS

Just, A., et al., "Two-Handed Gesture Recognition", IDIAP Research Institute, Switzerland, May 2005, 11 pages.

* cited by examiner

*Primary Examiner* — Kakali Chaki
*Assistant Examiner* — Mai T Tran

(57) ABSTRACT

An indexed hierarchical tree search structure converts each registration sample into an equivalent registration model based on the clustering of its registration item descriptors in the leaf nodes of the hierarchical tree. Query item descriptors from a query sample from someone wanting to be recognized are distributed into the hierarchical tree. A query model is defined based on the clustering of query item descriptors at the leaf nodes, and registration and verification are made based on comparison of the query model and the registration models.

20 Claims, 19 Drawing Sheets

S1 Create a Hierarchical Tree from Characteristic Features extracted from a library of Registration Biometric Sample S3 Register Characteristic Features from the Registration Biometric Samples into the Hierarchical tree to create a Reverse Index Tree S5 Define a separate biometric model (i.e. histogram) "$\mu$" for each Registration Biometric Sample using leaf node information from the Reverse Index Tree.

S7 Obtain Query Biometric Sample of Person wanting to be verified as being pre-registered, and Extract a Query Set of Characteristic Features from the Query Biometric Sample S9 Cluster the Query Set of Characteristic Features into the Reviser Index Tree S11 Define a Query Model (i.e. histogram) "x" for the Query Biometric Sample using leaf node information from the Reverse Index Tree.

S13 Identify the ID, $i$, of the registrant that renders the highest confidence, $i^*$, of matching the person that submitted the query biometric sample.

$$i^* = \arg\max_i P(x|i)P(i)$$

This can be achieved by identifying Registration Model, $\mu_{ij}$, that most closely matching the Query Model, $x$.

Recognize the ID $i$ corresponding to the Registration Model that most closely matches the Query Model as defined by:

$$i^* = \arg\max_i \sim (\max_j (x\mu_{ij}^T))$$

S15 Authenticate the ID $i$ corresponding to the Guassian Mixture model whose distance, $s$, to the Query Model is shortest, and whose distance is less than a first threshold, where distance $s$ is defined as:

$$s = \max_i \left(\max_j \left(x\mu_{ij}^T\right)\right)$$

where the optimal T value is obtained by $$T^* = \min_T \sum_i \sum_{j=1}^{M_i} \left\| sign\left(s_{ij} - T\right) - l_{ij} \right\|^2$$

where $l$ is the ground-truth label in [-1,1].

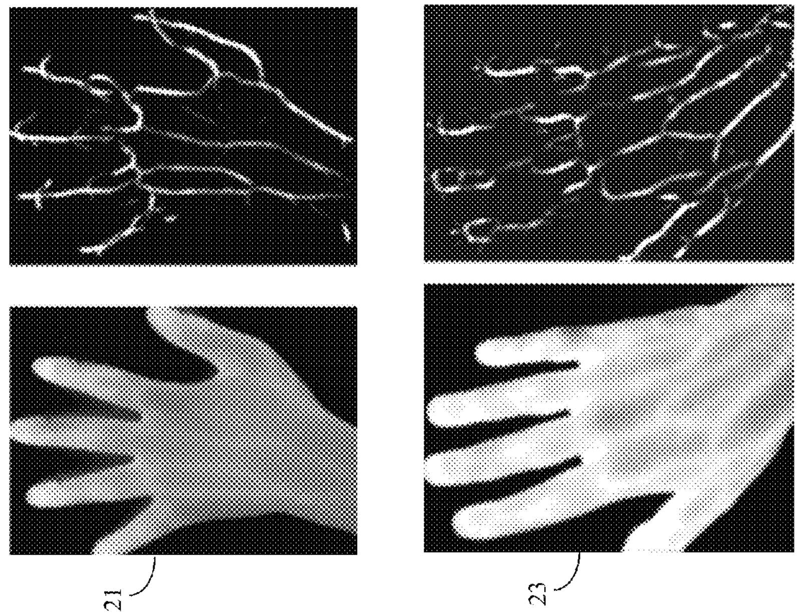
FIG. 2
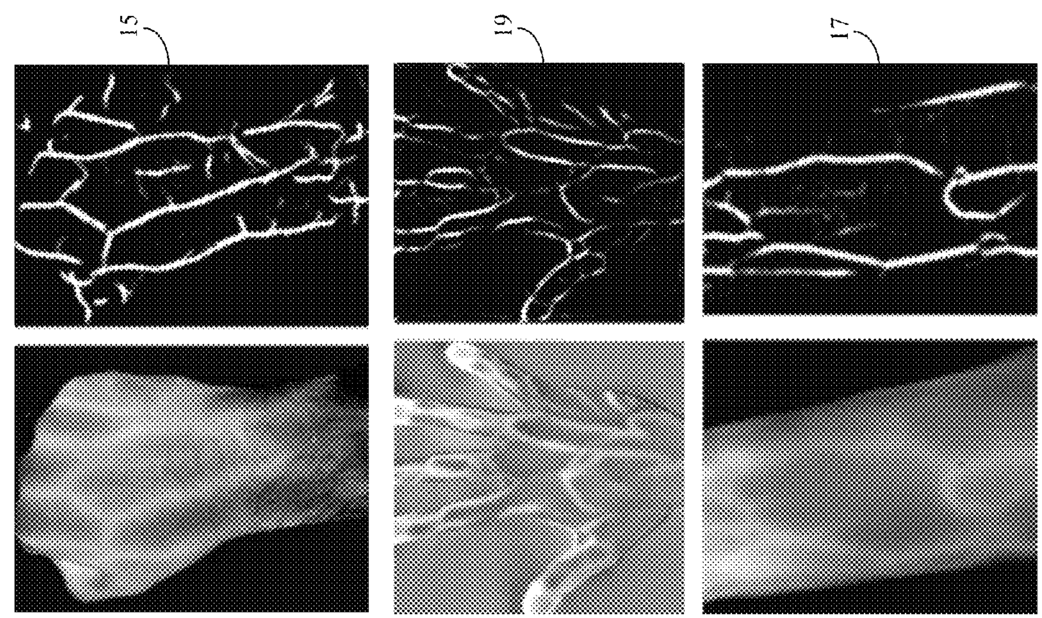

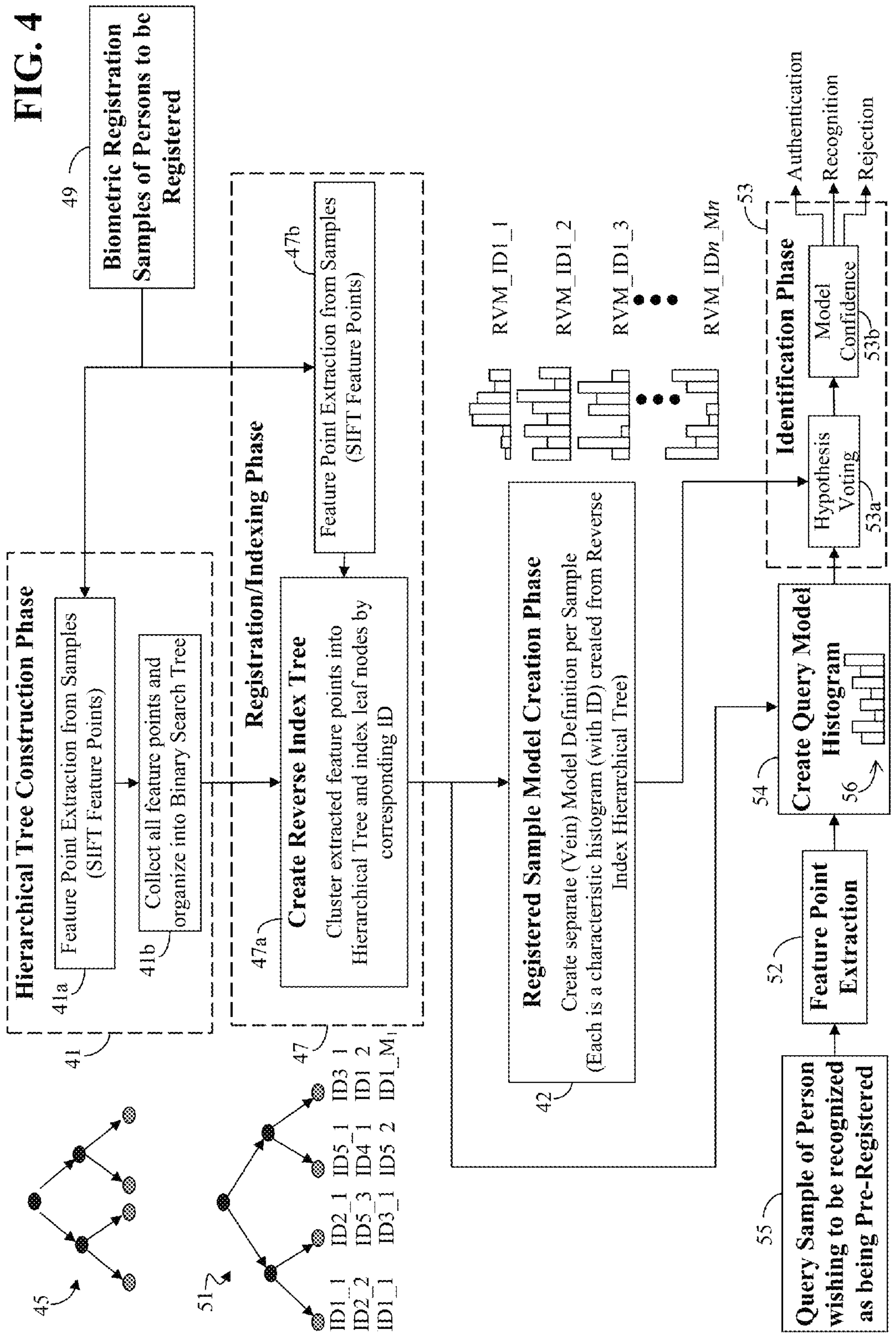
FIG. 4
49
Biometric Registration Samples of Persons to be Registered
41
Hierarchical Tree Construction Phase
41a
Feature Point Extraction from Samples (SIFT Feature Points)
41b
Collect all feature points and organize into Binary Search Tree
47
Registration/Indexing Phase
47b
Feature Point Extraction from Samples (SIFT Feature Points)
47a
Create Reverse Index Tree
Cluster extracted feature points into Hierarchical Tree and index leaf nodes by corresponding ID
45
51
ID1_1 ID2_2 ID1_1
ID2_1 ID5_3 ID3_1
ID5_1 ID4_1 ID5_2
ID3_1 ID1_2 ID1_M1
42
Registered Sample Model Creation Phase
Create separate (Vein) Model Definition per Sample (Each is a characteristic histogram (with ID) created from Reverse Index Hierarchical Tree)
RVM_ID1_1
RVM_ID1_2
RVM_ID1_3
RVM_IDn_Mn
53
Identification Phase
Hypothesis Voting
53a
Model Confidence
53b
Authentication
Recognition
Rejection
54
Create Query Model Histogram
56
52
Feature Point Extraction
55
Query Sample of Person wishing to be recognized as being Pre-Registered

*All data clustered under single center (mean)*

49
ID1_M1
ID1_3
ID1_2
ID1_1
ID2_1
IDn_Mn
IDn_2
IDn_1
47b
Scale Invariant Feature Transform (SIFT)
SIFT Feature Set Per Biometric Sample
RSet_ID1_1
RSet_ID1_2
RSet_IDn_Mn
47a
Create Reverse Index Tree

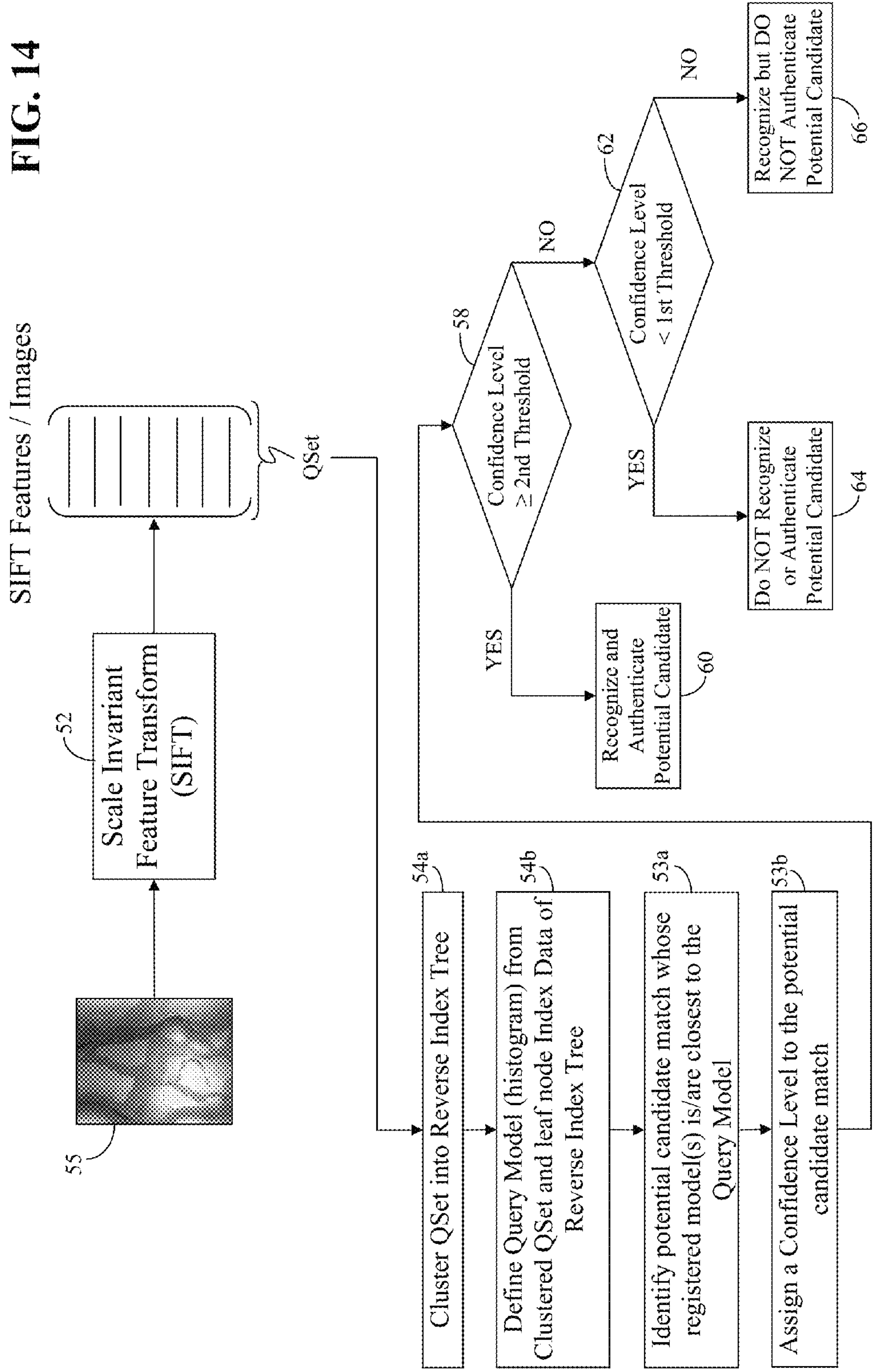
FIG. 14
SIFT Features / Images
55
52
Scale Invariant Feature Transform (SIFT)
QSet
54a
Cluster QSet into Reverse Index Tree
54b
Define Query Model (histogram) from Clustered QSet and leaf node Index Data of Reverse Index Tree
53a
Identify potential candidate match whose registered model(s) is/are closest to the Query Model
53b
Assign a Confidence Level to the potential candidate match
58
Confidence Level ≥ 2nd Threshold
YES
NO
60
Recognize and Authenticate Potential Candidate
62
Confidence Level < 1st Threshold
YES
NO
64
Do NOT Recognize or Authenticate Potential Candidate
66
Recognize but DO NOT Authenticate Potential Candidate

Histogram Confidence

{The Query Model and the Registered Vein Models (RVM's) are histograms}

Histogram Confidence

{The Query Model and the Registered Vein Models (RVM's) are histograms}

CONFIDENCE BASED VEIN IMAGE RECOGNITION AND AUTHENTICATION

BACKGROUND

1. Field of Invention

The present invention generally relates to a biometric identification system. More specifically, the present invention relates to the use of a reverse index tree to authenticate a specific registrant within a registry of individuals.

2. Description of Related Art

Biometrics refers to the use of intrinsic human traits for personal identification purposes. That is, a person may be identified by one or a combination of multiple different personal trait characteristics of that person. Examples of such personal traits are a fingerprint, a hand print (length and thickness of the fingers, size of the hand itself), a retina scan (pattern of blood vessels in the eye), an iris scan, a facial photograph, a blood vessel pattern (vein pattern), a voice print, a dynamic signature (the shape and time pattern for writing a signature), or a keystroke pattern (key entry timing).

An example of fingerprint biometrics for personal identification is illustrated in U.S. Pat. No. 6,041,133 to Califano et al., which illustrates the identification of distinguishing characteristics, or tokens, based on the shapes of fingerprints. The identified tokens are then organized in a suitable searching format. An example of using a hierarchical tree to organize identified tokens for purposes of object recognition using a voting method is illustrated in U.S. Pat. No. 7,680,748 to Heisele et al.

Of particular interest regarding the present invention, however, are biometric identification techniques that use blood vessels, or veins, for personal identification. A method for automatically identifying blood vessels in a diagnostic image is described in U.S. Pat. No. 7,343,032, and an example of a technique for obtaining diagnostic images of blood vessels from a human eye for personal identification (ID) purposes is shown in U.S. Pat. No. 6,569,104. Another example provided in U.S. Pub. No. 2010/0045788 describes the use of visible and near infrared light to acquire diagnostic images of a palm print image for personal identification. A technique for using vein authentication on a finger for identification purposes is described in U.S. Pub. No. 2010/0198078.

Various techniques are known for identifying specific pattern structures in diagnostic images. One technique for identifying blood vessel patterns is by means of path-based tree matching, such as described in U.S. Pat. No. 7,646,903. Tree matching algorithms require a tree structure as input. This structure describes a tree as a series of branches interconnected through branch points. Several known algorithms can be used to obtain a tree structure including tracking, segmentation, and skeletonization. Once the tree structure is obtained, a matching algorithm operates directly on the structure and any data contained therein.

There are various matching algorithms known in the art, but they tend to be slow and computationally intensive. What is needed is an efficient method of applying tree matching to biometric applications.

Another object of the present invention is to provide a hierarchical approach that not only identifies the closest matching vein pattern to a query, but also has the ability to reliably and efficiently authenticate a registrant and reject a false positive identification.

SUMMARY OF INVENTION

The above objects are met in a method of searching for a query object within an object class, the method comprising:

(a) accessing a collection of unique training samples of multiple training objects within the object class; (b) defining a separate training set of training item descriptors from each of the training samples; (c) creating a composite collection of training item descriptors from the separate training sets of sample item descriptors; (d) creating a hierarchical tree from the composite collection of training item descriptors according to relations in the training item descriptors, the hierarchical tree having a plurality of leaf nodes; (e) accessing registration sets of registration item descriptors defined from respective registration samples obtained from registration objects of the object class, distributing the registration sets of registration item descriptors into the hierarchical tree according to the relations defined in the creation of the hierarchical tree, indexing the registration item descriptors clustered within each leaf node to their corresponding registration samples; (f) defining a separate registration model for each registration sample based on the clustering of its corresponding registration item descriptors in each leaf node; (g) accessing a query sample from the query object, defining a query set of query item descriptors from the query sample, distributing the query set of query item descriptors into the hierarchical tree according to the relations defined in the creation of the hierarchical tree; (h) defining a query model for the query sample based on the clustering of the query item descriptors in each leaf node; and (i) using the query model, x, and the registration models to identify as a potential candidate match the registration object, i, that renders the highest confidence i* of matching the query object, defined as $i^*=\arg\max_i P(x|i)P(i)$.

Preferably in step (i) of this method, the registration object whose corresponding register model is deemed to most closely match the query model is identified as the potential candidate match.

Further preferably in step (d), the hierarchical tree is a binary tree.

Furthermore in step (e), the registration item descriptors are the training item descriptors, the registration samples are the training samples and the registration objects are the training objects. Alternatively in step (e), the registration samples are the training sample, and registration item descriptors are different from the training item descriptors. Further alternatively in step (e), the registration item descriptors are different from the training item descriptors, the registration samples are different from the training samples and the registration objects are different from the training objects.

Preferably in step (e), multiple registration samples are obtained from the same registration object in a many-to-one manner.

Additionally in step (f), each registration model uniquely identifies its corresponding registration sample.

In a preferred embodiment, in step (f), each registration model is a histogram the numbers of its corresponding registration item descriptors in each leaf node.

Also in step (h), the query model is defined in a manner analogous to how the registration models are defined.

Preferably in step (i), IF a measure of the similarity between the query model and a Gaussian mixture of the registration models that correspond to the potential candidate match is greater than a first threshold, THEN the query object is deemed to be registered and correspond to any one of the registration objects. Additionally in step (i), IF the measure of the similarity is further greater than a second threshold higher than the first threshold, THEN the query object is deemed to be authenticated and specifically correspond to the potential candidate match. Also in step (i), IF the measure of the similarity is not greater than the first threshold, then the query object is rejected as not corresponding any registration object.

In a preferred embodiment in step (i), each registration object i corresponds to $M_i$ registration models; the query model and the registration models are in matrix form; the registration models are denoted $\mu_{ij}$ where i specifies a registration model's corresponding registration object and j identifies a specific one of the multiple registration models $1-M_i$ that correspond to registration object i; the registration samples that corresponds to the same registration object are described by a Gaussian mixture model, as follows:

$$P(x|i) \sim \{w_{ij}, N(x|\mu_{ij}, \sigma_{ij}^2)\} \; \forall j=1, \ldots M_i$$

where N is the normal distribution, σ is the variance, and $w_{ij}=1/M_i$; and the registration object i whose corresponding confidence i* satisfies the relationship $i^*=\arg\max_i=(\max_j(x\mu_{ij}^T))$ is deemed the potential candidate match.

In this case, IF i* is greater than a first threshold, THEN the query object is deemed to be registered and correspond to any one of the registration objects.

Additionally in a preferred embodiment, for each registration object, a Gaussian mixture is defined for all its corresponding registration models, and an authentication confidence s is defined as $$s=\max_i(\max_j(x\mu_{ij}^T))$$

where $\mu_{ij}$ denotes the registration models, i specifies a registration model's corresponding registration object, j identifies a specific one of the multiple registration models that correspond to registration object i, and T is the transform operator; and IF s is greater than a predefined threshold of confidence greater than i*, THEN the query object is deemed to be authenticated and specifically correspond to the potential candidate match.

In this case, an optimal value of T is defined as $$T^* = \min_T \sum_i \sum_{j=1}^{M_i} \|\text{sign}(s_{ij} - T) - l_{ij}\|^2$$

where l is the ground-truth label in [−1,1].

The above objects are also met in a registration verification system implementing the method of claim 1.

The preferred method further includes destroying the training samples and the training sets of training item descriptors.

In a preferred implementation of the above method, the object class is a human person, and the training samples, registration samples and query samples are biometric samples of a human person.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

In the drawings wherein like reference symbols refer to like parts.

FIG. 2 shows various types of vein maps as examples of object classes.

FIG. 3 illustrates the identification of item descriptors in an image using a SIFT transform.

FIG. 4 provides a general overview (project flow) of the present invention.

FIG. 14 is a process flow summary of an embodiment of the present invention.

DESCRIPTION OF THE PREFERRED EMBODIMENTS

Figure 1:
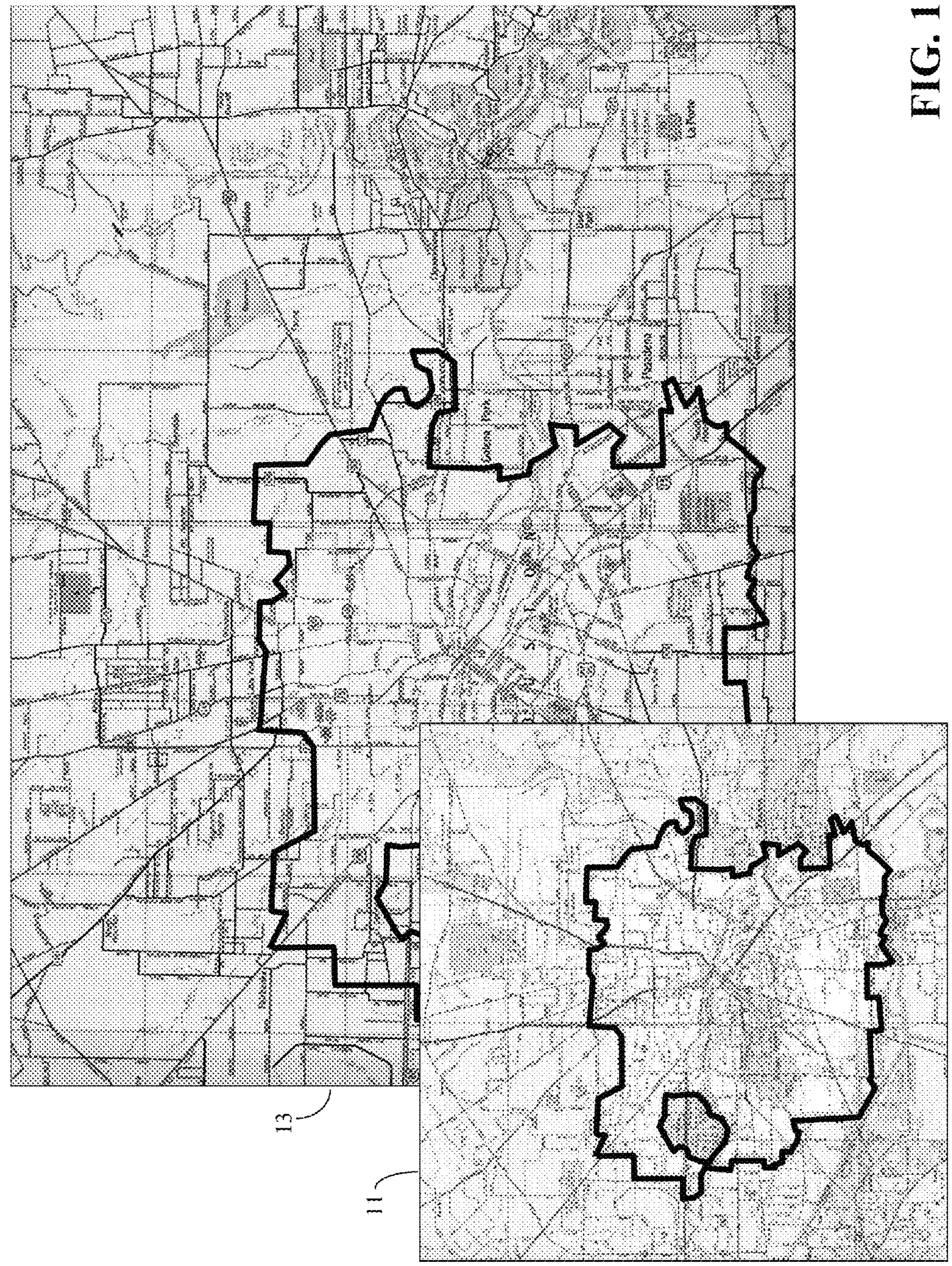
FIG. 1 shows street maps as an example of an object class.

People have many distinctive and personal characteristics that distinguish one person from another. Some examples of these distinguishing characteristics are fingerprints, facial features, vein (or blood vessel) patterns in various parts of the body, voice point, etc. The use of one (or a combination of) such distinguishing characteristics, or traits, to identify (or to verify the identity of) someone is termed Biometrics.

Biometrics thus involves receiving a test sample (i.e., a query sample or a sample for query purposes) of a biometric feature, such as a finger print, and comparing the test sample with a registry of known (i.e., pre-registered) samples in an effort to find a match. Typically, the registry is built by registering known individuals. Each registering individual submits a true sample of a specific biometric feature, which then becomes his registered sample and is identified with that individual. In this manner, the registered sample is known to correspond to (i.e., is registered to) a specific individual, and a person's identity can be confirmed by matching his/her newly submitted test sample(s) to his/her registered sample (s).

In the typical biometric identification process, a submitted query sample of someone wishing to be identified (i.e., authenticated or verified) as a registered person is compared with a registry of registered samples. If a match is found, then the query sample is identified as corresponding to the registered person associated with the matched registered sample. If the person is not already registered within the registry of biometric samples, then the process should reject the person as unknown and not verified. Thus, the biometric identification process should only authenticate (i.e., recognize) registered persons. Much research has been made into various methods of precisely matching a submitted query sample to a library of registered sample, and avoiding false positives (i.e., erroneously authenticating a non-registered person).

Problems may arise when a query sample submitted for recognition is truly from a registered person, but the query sample is not identical to the registered person's registered sample due to various circumstances. For example, the testing device that acquires the query sample may not be as precise as (or may otherwise be different from, or provide a different or partial view as) the device used to originally register the person. Variations may also be due to physiological changes in the registered person that cause his/her test sample to vary to some degree from the registered sample (i.e., the true sample previously used to register the person). In this case, the biometric algorithm should be flexible enough to allow for such variations, but still be sophisticated enough to avoid mistakenly verifying a person that is not in the registry.

In a preferred embodiment, a group of persons may be registered by first submitting their personal biometric sample (s). If more then one type of biometric sample is provided, each may be analyzing separately or together, and the analysis results may then be organized into an easy to search format. Similarly, if multiple samples of the same biometric type are provided, the analysis results of all the samples may then be organized together into the preferred search format.

Preferably, this search format is based on a hierarchical tree model (i.e., structure). Analysis may include identifying characteristic features (or sample values of categories of features) in the biometric samples, and organizing these characteristic features into the hierarchical tree. For example, if the biometric samples being used for authentication are finger vein patterns, then a specified number of distinguishing features are identified and categorized (or grouped) for each of the real-world finger vein patterns, and these categories are then organized into an easy to search format. When a person is registered, his/her specific number of distinguishing features (identified from his/her submitted biometric sample) are sorted by similarity, which can be organized into the hierarchical tree. Further preferably, the thus constructed hierarchical tree is reversed indexed to the persons being registered by indexing each registrant's ID to the leaf node that receives any part a registrant's corresponding characteristic features.

Verification of a registered person is a similar process of receiving a person's query sample, identifying a query set of distinguishing features in the query sample, and identifying which categories these distinguishing features would sort into by similarity in the hierarchical treed. Since the hierarchical tree is reversed indexed, each identified category would list the identifications (ID's) of the registered persons who are represented in that category (i.e., whose registered samples have some distinguishing feature sorted into that category). One could used a voting method to identifying a query sample as a candidate for authentication simply by noting the ID that is found most often in the categories into which the query sample is sorted.

However, a preferred method of searching for a match for the query sample takes advantage of a reversed index hierarchical tree constructed from the plurality of registered true samples. After the reverse index hierarchical tree is constructed, its leaf nodes are used to define a separate (and preferably unique) "model" or "pattern" or "histogram" for each corresponding registered true sample. This creates a library of registered models. When a person wishing to be recognized as a registered person submits his/her query sample, characteristic features are identified within the query sample, and these identified characteristic features are sorted into (i.e., clustered in) the existing reverse index hierarchical tree. A query model is then defined for the query sample based on the hierarchical tree's leaf nodes and how the query sample's characteristic features sorted into the leaf nodes. The query model is then compared to the library of registered models, and the query model may be matched to the registered person whose corresponding registry model (or combination of corresponding registry models) most closely matches the query model.

An added benefit of the present method is that it may be applied to various types of search applications. That is, it may be used to identify specific items of a given item class. For example if the item class is street maps, as shown in FIG. 1, it can be used to quickly find a match between a portion of a small street map 11 (i.e., the specific item), with a corresponding portion in a larger street map 13. The present invention, which is more fully explained below, may be extended to any mapping of data of images of a given item class. For example, it may be applied to political maps, climate maps, or economic resource maps to identify a period in the past that most closely matches a current situation. The invention could also be applied to physical maps, road maps, and topographic maps.

For illustration purposes, the present invention is described as applied to a vein distribution map, but it is to be understood that it may be equally applied to other types of biometric identification features, such as for example, fingerprints, hand prints, a retina scans, iris scans, a facial photographs, blood vessel patterns, voice prints, dynamic signatures, keystroke patterns, etc.

For illustration purposes, FIG. 2 provides some examples of vein distribution maps. Vein maps of the back of a first 15 and an arm 17 are shown. Also shown are three examples 19-23 of vein maps of the back of opened hands. As is self-evident, there are general similarities between the three opened hand vein maps 19-23, but each is still distinguishable from all others. Thus, general categories of distinguishing features for a given type of biometric sample (or map) may be defined, but the combination of individual, distinguishing features obtained from a person's biometric sample (as sorted into the defined categories) may still be used to uniquely identify an individual.

Since the present invention is illustrated as applied to vein maps, and since maps may be in the form of vein map images, a first topic of discussion is how to identify a specific number of distinguishing features from a given map image sample. It may therefore be beneficial to first address some aspects of image processing and computer vision, particularly in the areas of feature detection and feature extraction.

In the field of computer vision, correspondence matching refers to the matching of objects (or object features or feature points or descriptors) common to two, or more, images. Correspondence matching tries to figure out which parts of a first image corresponds to (i.e., are matched to) which parts of a second image, assuming that both are true images of a command subject taken at different times and/or from different view points. For example, the first image may be of a real-world scene taken from a first view angle with a first field of vision, FOV, and the second image may be of the same scene taken from a second view angle with a second FOV. Assuming that the first and second FOVs at least partially overlap, correspondence matching refers to the matching of common feature points in the overlapped portions of the first and second images.

Thus, the subject of feature based correspondence matching in images (and in particular, the subject of how to identify characteristic feature points of specific objects within an image for the purposes of corresponding matching) is relevant to the present discussion. One example of a feature based correspondence matching algorithm is the scale-invariant feature transform, SIFT. The SIFT transform (or algorithm or process) identifies points of interest (or feature points or item descriptors) in a 2D image. Each feature point would typically correspond to an individual pixel in the image.

A more detailed discussion of the SIFT transform is provided in U.S. Pat. No. 6,711,293 to Lowe, herein incorporated in its entirety by reference. When used in object recognition, the SIFT transform would use a library of training images to identify feature points (i.e., pixels in an image) that are characteristic of a specific type of object (or item class). Once a library of the object's characteristic feature points have been identified, the feature points may be used to determine if an instance of the same type of object is found in a newly received image. Principally, feature points (i.e., item descriptors) of the object item are extracted to provide a "feature description". This feature description can then be used to search for examples of the specific object item in a test image containing many object-types. To perform reliable recognition, it is preferred that the features extracted from the training images be detectable under changes in image scale, noise, illumination, and rotation. To reduce the contribution of the errors caused by local variations, SIFT typically detects and uses a large number of feature points from the images.

In a typical SIFT application, feature points are first extracted from a set of training images and stored in a database. An object is recognized in a new image by individually comparing each feature point from the new image to this database and finding candidate matching feature points based on Euclidean distance of their feature point vectors. From this full set of matches, subsets of feature points that agree on the type of object and its location, scale, and orientation are identified and filtered out as potentially good matches. Consistent clusters of good matches are then identified. Typically, each cluster of three or more features that agree on an object and its pose is then subject to further detailed model verification and subsequently outliers are discarded. Finally the probability that a particular set of features indicates the presence of a specific object item is computed, given the accuracy of fit and number of probable false matches. Object item matches that pass all these tests can be identified as correct.

Figure 3:
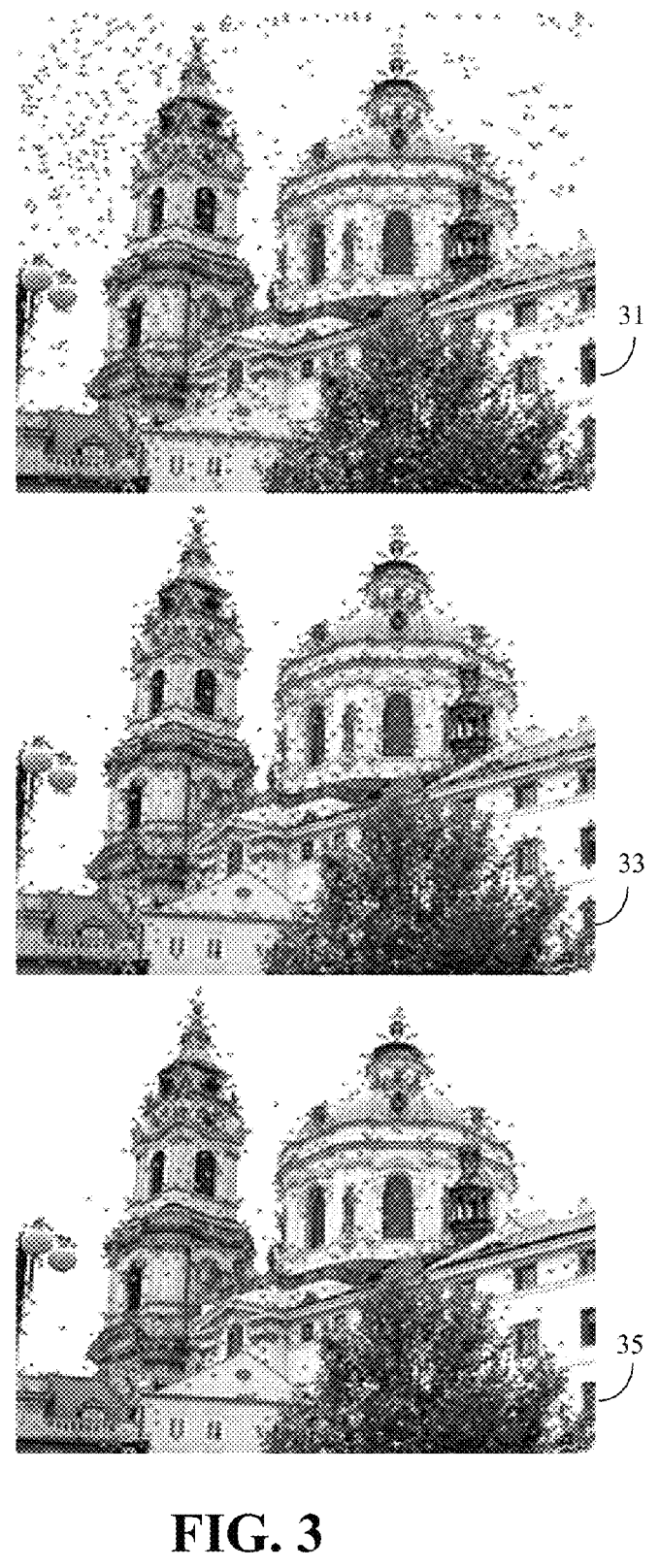

Identification of feature points is of particular interest to the present invention. An example of a SIFT determination of feature points is illustrated in FIG. 3. Feature points usually lie near high-contrast regions of an image. Possible feature points are first identified, as indicated by dark dots in image 31. Possible feature points that have a low contrast are then discarded, as illustrate in image 33. Finally, possible features points located on edges are removed, which leaves the final set of feature points shown in image 35.

The present invention, however, does not make use of SIFT's ability to correlate similar objects in multiple images. Of more interest to the present invention is the SIFT transform's ability to identify of item descriptors (i.e., SIFT descriptors or feature points) from a given image. As is described in more detail below, the SIFT descriptors can be used as the above-described characteristic features used in the present invention to create a descriptive model of a given biometric sample.

Since an objective of SIFT's algorithm is to identify similar item descriptors in two, or more, images, it is clear that each item descriptor (i.e., each pixel description) needs to be highly distinguishable from others. This is achieved by the number of descriptive characteristics (or descriptive data) used to identify (i.e., describe) each item descriptor. In a typical SIFT transform, each item descriptor is characterized by 128 pieces of descriptive data. That is, each item descriptor (i.e., pixel point in the present example) may be thought of as a 128-dimension vector. The present invention uses SIFT only to identify item descriptors within an image, and then uses the identified sets of items descriptors as characteristic features in its registration and identification processes. It is to be understood however, that other methods of identifying characteristic features (or item descriptors) within a map or image may be used without deviating from the present invention.

A general overview of a hierarchical tree construction phase/block 41, registration/indexing phase/block 47, registered sample model creation phase/block 42, and identification phase/block 53 in accord with the present invention is illustrated in FIG. 4. Both, the hierarchical tree construction phase 41 and registration/indexing phase 47, make use of the same library of biometric samples 49 (i.e., registrable item samples). Preferably, biometric sample library 49 is comprised of a plurality of biometric samples (i.e., image samples) of each person to be registered, and each registration sample within library 49 includes an identification code (ID) identifying (i.e., indexed to) its corresponding person.

When used with the hierarchical tree construction block 41, biometric sample library 49 serves as a training library identifying and organizing characteristic features of the particular biometric type into a sorting tree structure, such as illustrated by simplified hierarchical tree 45. When used with registration/indexing block 47, biometric sample library 49 serves as a registration library to index (i.e., register) information clustered into the hierarchical tree to the persons being registered, which results in a reverse index tree, such as illustrated by simplified reverse index tree 51. In a sense, registration/indexing phase 47 attaches a probability measure to each leaf node, which indicates the probability of a registered person having a portion of his/her characteristic feature(s) sorted into that leaf node.

For ease of discussion, therefore, when biometric sample library 49 is used in conjunction with hierarchical tree construction block 41, it will be termed a "training library 49". Similarly, any samples or item descriptors used in hierarchical tree construction block 41 may be termed training samples and training item descriptors, respectively. Conversely, when biometric sample library 49 is used in conjunction with registration/indexing block 47, it will be termed a "registration library 49." Similarly, any samples or item descriptors used in registration/indexing block 47 may be termed registration samples and registration item descriptors, respectively.

Although the presently preferred embodiment uses the same library 49 for both the creation of hierarchical tree 45 in block 41 and for the creation of the reverse index hierarchical tree 51 in block 47, blocks 41 and 47 preferably define their own sets of item descriptors from the same sample library 49. However, some alternate embodiments of the present invention envision using separate libraries for blocks 41 and 47. For example, a first training library (such as from a general population of a the given object class, i.e., general finger vein samples from a general population) may provide registration samples and registration feature descriptors for block 41, and a second library (different from the first library) may provide registration sample and registration item descriptors of the specific persons to be registered, which will differ from the set of the general population. Further alternatively, blocks 41 and 47 may use the same library of samples 49, but block 41 may extract sets of items descriptors that are different than the sets of item descriptors extracted by block 47. However, if preferred in another embodiment, both blocks 41 and 47 may use the same samples and same item descriptors.

Returning to the presently preferred embodiment, when preparing biometric sample library 49, it is preferred that a person to be registered provide more than one sample of a given biometric type, and that each of the provided biometric samples be indexed to the same person, such as in a many-to-one manner. An example of this may be the case where multiple vein images of the same finger (or different fingers) from the same person are provided. For instance, if the multiple images are of the same finger, then the different registration biometric samples from the same person would form a set within library 49. The different biometric image samples within this set may be taken from different angles (including overlapping views) of the same finger, or from different portions (including overlapping portions) of the same finger and/or same directional view. For example, one biometric sample may be a front vein view of a finger, another may be a left vein view of the same finger, a third a right vein view of the same finger, and another a corner vein view of the same finger overlapping the front vein view with either of the left or right vein views. This approach is advantages because when the registered person later wants to be recognized as being pre-registered, he/she would create a new query biometric sample to compare with the registered biometric samples, and it is likely that the query biometric sample may not match exactly the view direction of any of the registered biometric samples previously provided. However, if multiple registration biometric samples from multiple views are provided, their composite information is more likely to match at least a part of the query biometric sample.

Hierarchical tree construction phase 41 preferably uses a SIFT application 41*a* (or some other characteristic feature identification/extraction method) to identify a separate training sample set of (training) item descriptors for each biometric sample image in training library 49. As is explained above, SIFT application 41*a* identifies a set of item descriptors for each biometric sample image, and each item descriptor includes 128 pieces of descriptive data. Block 41*b* collects the item descriptors of all the biometric (training) sample images into a composite collection of training item descriptors, and this composite collection is organized into a hierarchical tree structure according to relations (i.e., similarities) in the item descriptors. The hierarchical tree may be defined in any of a number of different methods known in the art. For example, relations among the collection of training item descriptors may be established by a k-means process, a recursive k-means process, an EM optimization process, an agglomerative process, or another data clustering process. For illustrative purposes, simplified hierarchical tree 45 is shown having only 7 nodes (including 4 leaf nodes) as the output from hierarchical tree construction phase 41. In the present example, each of the leaf nodes of simplified hierarchical tree 45 would correspond to a group of item descriptors sharing a similarity in some common relation, i.e., having some similar characteristic(s).

A more detailed discussion of hierarchical tree construction phase 41 is provided in reference to FIGS. 5 to 9. In the present example, the objective is to cluster characteristic feature data hierarchically in a tree structure using a method such as k-means or canopy clustering.

Figure 5:
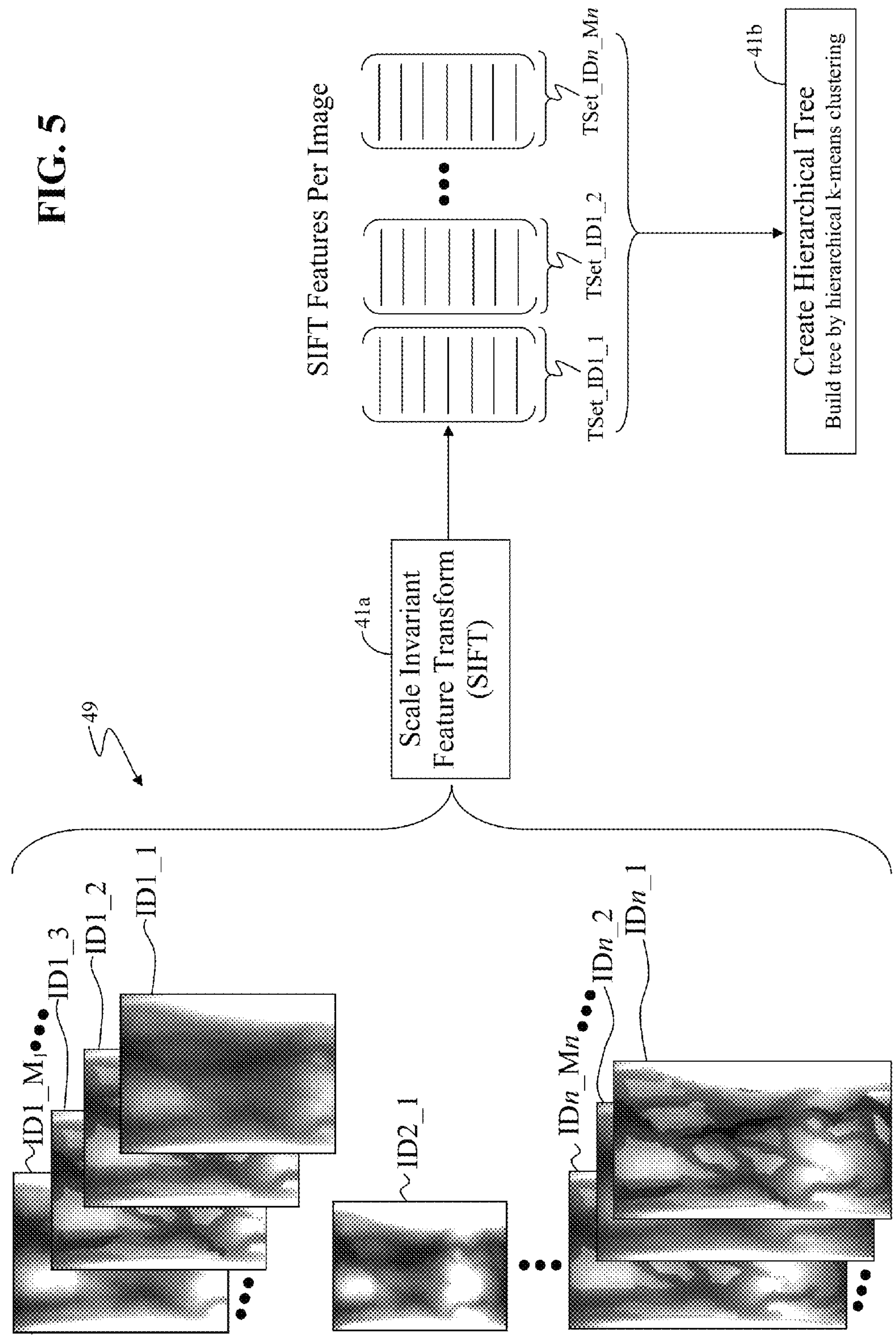
FIG. 5 illustrates the extraction and use of item descriptors (feature points or characteristic features) from registrants' images (i.e., registration/training samples) of a given object class (finger vein pattern).

With reference to FIG. 5, training library 49 provides its sets of biometric samples for construction of the hierarchical tree. As is explained above, each person being registered may provide one ore more biometric samples. For ease of illustration, each of n persons to be registered is assigned a distinct numeric identification code, ID1 through IDn. For ease of illustration, each of multiple biometric samples provided by the same person is further identified with that person's ID plus a sequential numeric index. For example, if person ID1 provides four biometric samples, then his/her biometric samples would be identified as ID1_1, ID1_2, ID1_3, and ID_4. Since the total number of biometric samples provided by each person to be registered may be different, this indefinite number is herein identified as "N" plus a subscript identifying the numeric ID of the person to which it corresponds. For example, if person ID3 provides $N_3$ total biometric samples, then these biometric samples would be identified as ID3_1 through ID_$N_3$, and If person ID5 submitted $N_5$ samples, then his/her samples would be identified as ID5_1 through ID_$N_5$. Following this nomenclature, training library 49 shows that person ID1 provided biometric samples ID_1 through ID1_$N_1$, person ID2 provided only one biometric sample (ID2_1), and so on up to the last person IDn, who provided IDn_Nn biometric samples.

Each of training images ID1_1 though IDn_Nn is a true biometric sample image of the desired biometric type (or other item class) taken from the person who is to be registered. In the present example, the biometric type is a finger vein map, such as can be obtained by means of an IR camera sensor. In order to identify and categorize similarities between the training images ID1_1 though IDn_Nn, training library 49 is submitted to an application to identify a set of item descriptors per biometric sample. In the present example, this is achieved by means of a scale-invariant feature transform (SIFT) processing block 41*a*, which outputs a separate training set of item descriptors (TSet_ID1_1 to TSet_IDn_n) for each of biometric samples ID1_1 though IDn_Nn, respectively. Preferably, each training set of item descriptors TSet_ID1_1 to TSet_IDn_n consists of Z item descriptors, but if desired, their number of item descriptors may differ.

The separate training sets of item descriptors RSet_ID1_1 to RSet_IDn_n are then submitted to block 41*b*, which as explained in reference to FIG. 4, collects all the feature points into a composite collection of training item descriptors and organizes them into a hierarchical tree structure according to relations (similarities) in the item descriptors.

Figure 6:
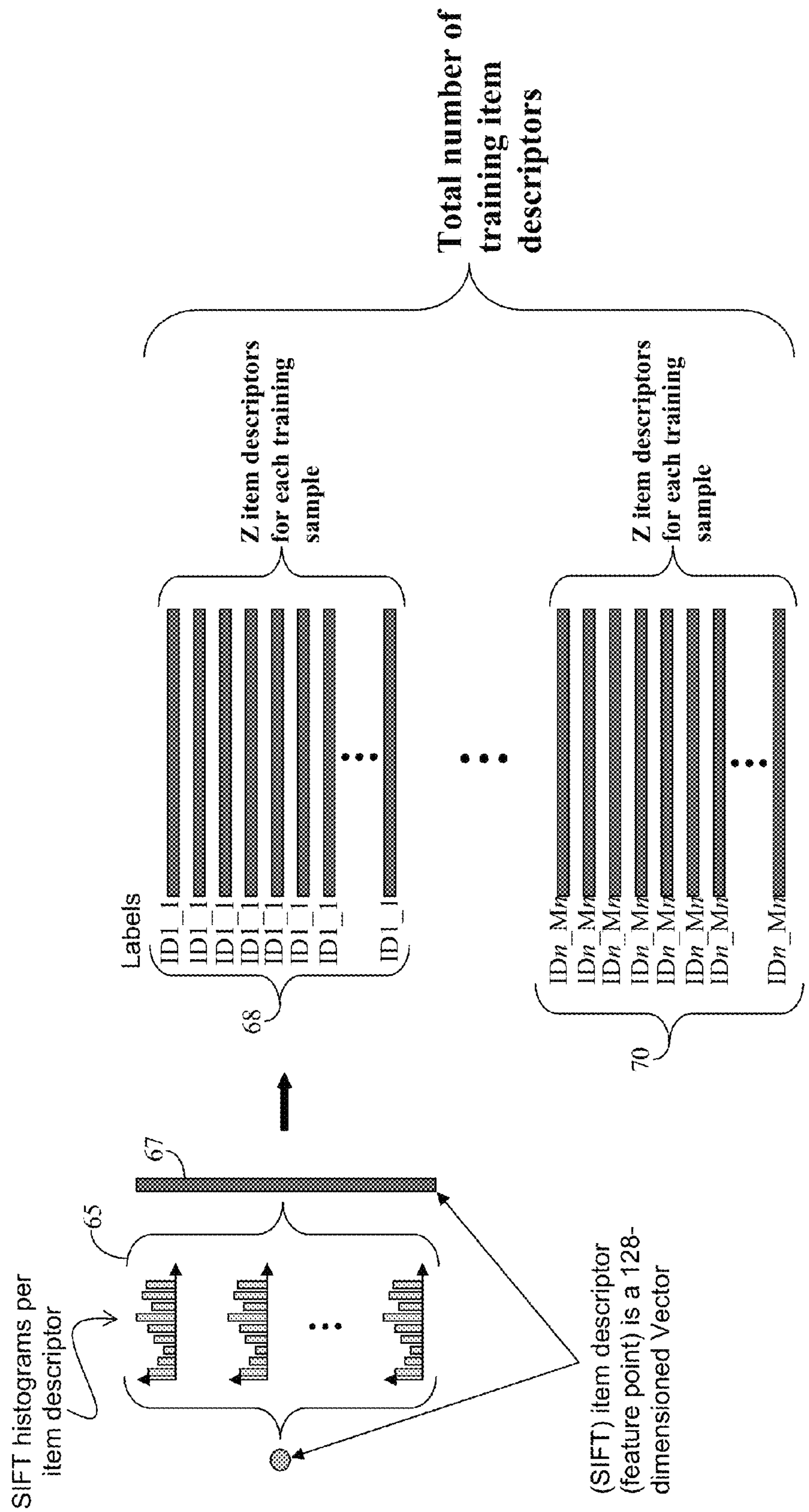
FIG. 6 illustrates the organization of item descriptors (generated using the SIFT transform) into a set of item descriptors.

A quick overview of SIFT feature point extraction block 41*a* is illustrated in FIG. 6. As is known in the art, a typical SIFT processing algorithm creates a series of SIFT histograms 65 to describe each identified item descriptor (or feature point or SIFT descriptor). Each of SIFT histograms 65 statistically describes a distinguishing characteristic of the item descriptor relative to a neighborhood of pixels surrounding the item descriptor in the image being processed. The series of SIFT histograms 65 are then collected into one vector 67, which constitutes one item descriptor. Each vector 67 describes an item descriptor (i.e., feature point or characteristic feature or feature pixel) and consists of 128 pieces of descriptive data. Thus, each item descriptor is characterized (i.e., described) by a 128-dimensioned vector 67.

The item descriptors may be labeled to identify the training sample image from which they were extracted. In the present example, group 68, is the group (or set) of item descriptors from first biometric sample image ID1_1, and group (or set) 70 is the group of item descriptors from the last biometric sample image IDn_Nn. The SIFT descriptors corresponding to any given biometric sample constitutes a set of item descriptors for that training image. For example, biometric sample image ID1_1 is shown to have a set of Z item descriptors. If desired, all images may be made to have the same number of item descriptors. In this case, all training images (i.e., all biometric sample images) would each have a set of Z item descriptors.

In the presently preferred embodiment, all the sets of items descriptors are collected into a composite collection of item descriptors, which is then used to construct a hierarchical tree, as described above in reference to block 41*b*. One method of achieving this is through a recursive k-means application, as is illustrated in FIGS. 7-9.

Figure 7:
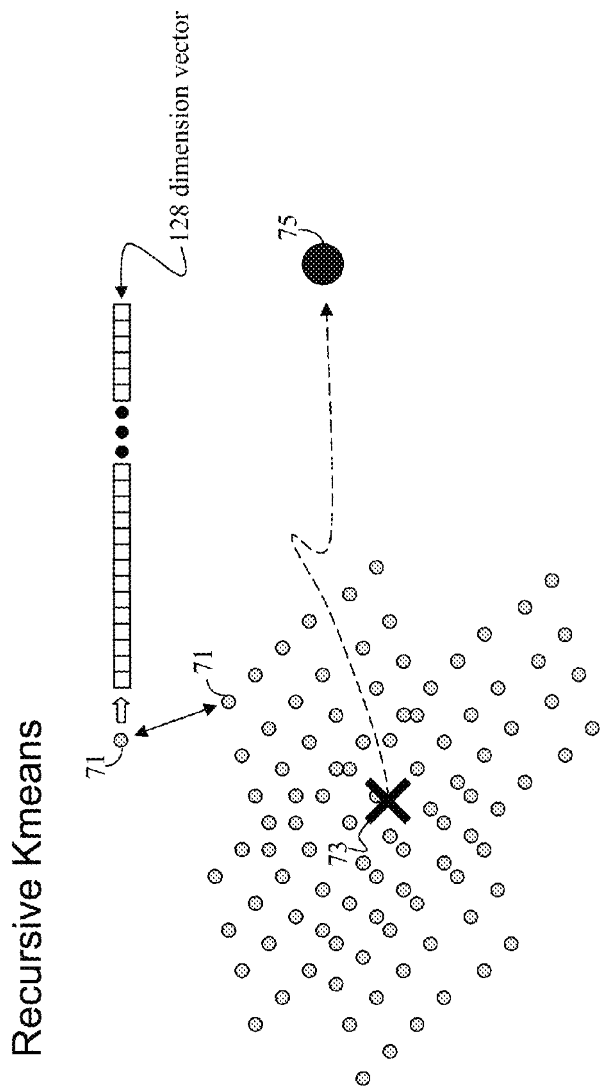
FIGS. 7 to 9 illustrate the organizing of a composite collection of training item descriptors from separate training sets of item descriptors into a hierarchical tree structure using a recursive k-means technique.

With reference to FIG. 7, although each item descriptor, such as point 71, is a 128-dimension vector, for ease of illustration a clustering of lower-dimensioned item descriptors under a single center (preferably the mean value) is shown. This mean value point 73 may define the root node 75 of the hierarchical tree that is to be constructed.

Figure 8:
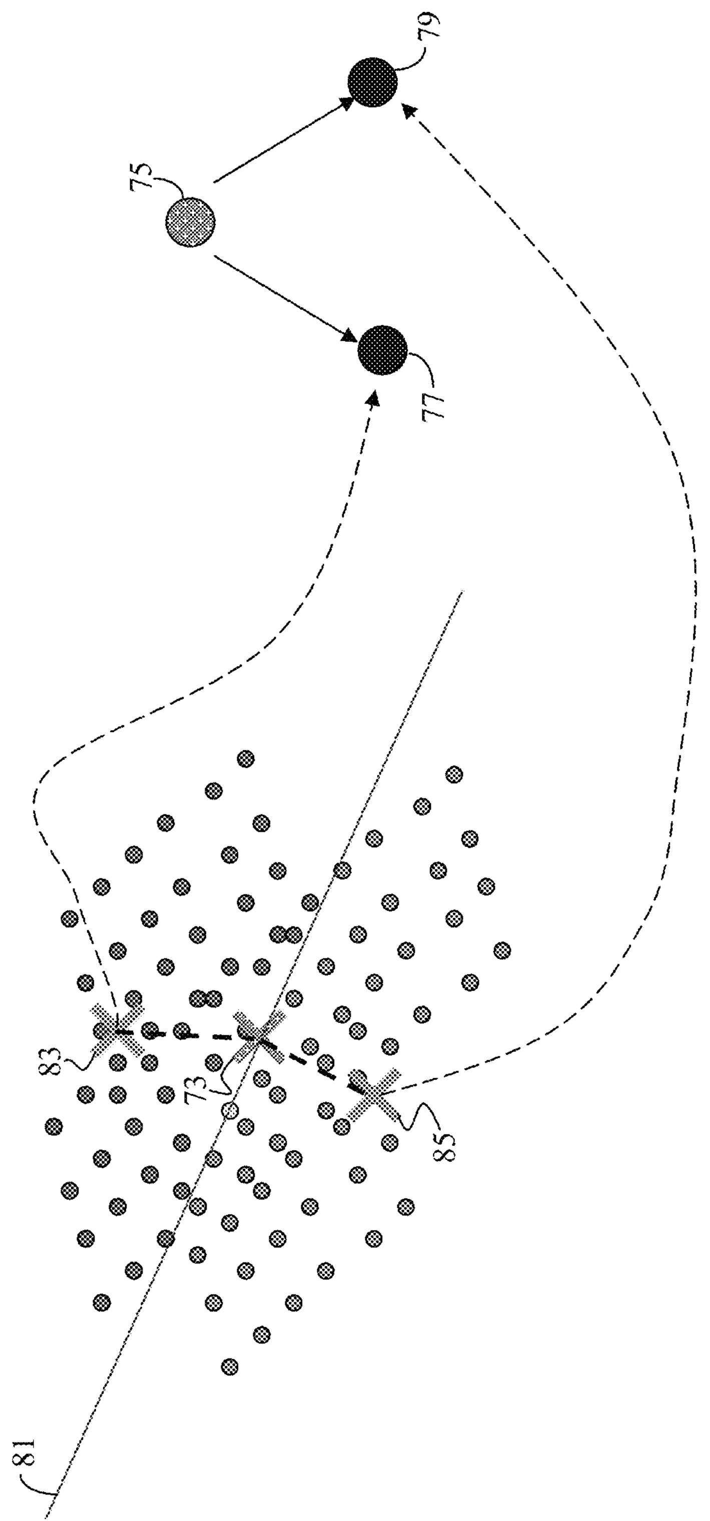
Figure 9:
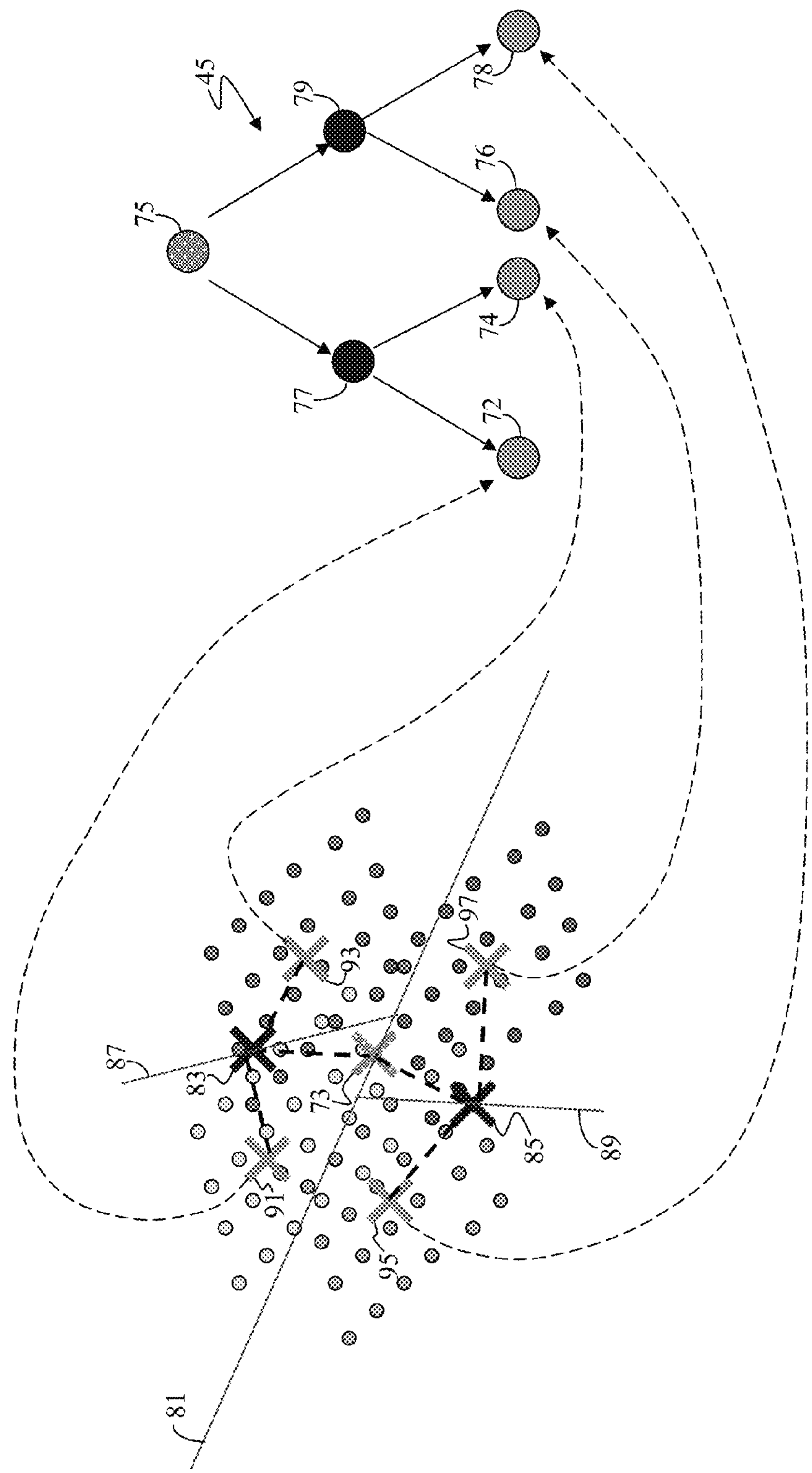

As illustrated in FIG. 8, the item descriptor data is then split into two groups (for example two substantially equal groups) along mean point 73, as illustrated by dividing line 81. This creates two new center points 83 and 85 in the two newly created groups, respectively. As before, the two new center points 83 and 85 may be defined by the mean of their respective groups of data. Each of center points 83 and 85 may define respective child-nodes 77 and 79 under root node 75. With reference to FIG. 9, each of these two groups may then be divided along their respective center points 83 and 85, as illustrated by dividing lines 87 and 89, respectively. This results in four newly created groups of data, each of which defines a new respective center point 91, 93, 95 and 97. As before, center points 91, 93, 95 and 97 may be defined by the mean of their respective group of data. Center points 91 and 93 may define child-nodes 72 and 74 under node 77 in hierarchical tree 45, and center points 95 and 97 may define child-nodes 76 and 78 under node 79 in hierarchical tree 45. It is to be understood that the data may continue to be divided to define additional child-nodes in simplified hierarchical tree 45. For example, each group of data may continue to be divided until the distance (i.e., the difference) between data within a group is not greater than a predefined maximum.

In a hierarchical tree structure, as it is known in the art, the root node is the top-most node in the hierarchical tree, a parent node is a node that has at least one other node below it and linked to it, a child node is a node linked to a parent node above it, and a leaf node is a node with no child nodes below it. A leaf node is effectively a bottom-most node along a link path (or branch path) downward from the root node. Thus, in the example of simplified hierarchal tree 45, node 75 is the root node, nodes 77 and 79*a* are intermediate nodes (i.e., nodes linked to a parent node above them and linked to a child node below them), and nodes 72, 74, 76 and 68 are leaf nodes (i.e., nodes with no child nodes below them).

Returning to FIG. 4, with hierarchical tree 45 thus completed, the process exits block/phase 41 and enters registration/indexing phase/block 47, which in a presently preferred embodiment uses the same biometric sample library 49 to index hierarchical tree 45 to the persons being registered. That is, registration library 49 (i.e., the biometric registration samples) of each person to be registered are submitted to registration/indexing phase block 47. As is explained above, each biometric registration sample includes an identification code (ID) identifying its corresponding person.

Registration/indexing phase 47 preferably uses the same feature identification technique used by hierarchical tree construction phase block 47 (i.e., SIFT feature point extraction in the present example) to identify a separate, and corresponding, registrable set (or registration set) of item descriptors for each biometric sample within registration library 49. Thus, registration library 49 is shown submitted to another SIFT-base feature point extraction block 47*b*. Due to the intricacies of the SIFT algorithms, the registration set of item descriptors identified by registration/indexing phase 47 may or may not be the same as (i.e., may not be identical to) the training set of item descriptors identified by hierarchical tree construction phase 41. However as before, the SIFT application 47*b* identifies a registration set of item/feature descriptors for each biometric registration sample image within registration library 49, and each registration item descriptor includes 128 pieces of descriptive data. The resultant registration sets of item descriptors are submitted to the create reverse index tree block 47*a*, which indexes the leaf nodes of the hierarchical tree produced by block 41 to the persons that provided the biometric registration samples 49, such as illustrated by simplified reversed index tree 51.

Create reverse index tree phase/block 47*a* distributes (i.e., clusters or sorts) the registration sets of registration item descriptors produced by feature extraction block 47*b* into the hierarchical tree produced by hierarchical tree construction phase 41, as illustrated by simplified tree 45. The registration sets of registration item descriptors are clustered according to the relations in the registration item descriptors established in the creation of the hierarchical tree from block 41. That is, the registration sets of registration item descriptors are preferably distributed using the same data clustering technique used by the hierarchical tree construction phase 41. Any part of a registration set that clusters to a leaf node also receives the ID code of (i.e., is indexed to) the biometric registration sample (and thus also to the registered person) to which that part corresponds, which results in a reverse indexed hierarchical tree structure. Thus, each part of a registration feature descriptor that clusters to a leaf node provides a vote for (i.e., identifies) its corresponding registered person.

Reverse index tree 51 is a simplified illustration of a reversed indexed hierarchical tree as produced by registration/indexing phase 47. Any item descriptor (or part of an item descriptor) that is clustered to a leaf node is assigned the ID code of the registered person to which the received item descriptor corresponds. In the present example, five persons' ID's (i.e., ID1, ID2, ID3, ID4, ID5), each with one or more biometric samples are illustrated. As shown, a leaf node may have more than one feature descriptor datum corresponding to the same person (including parts of feature descriptors from the same registration sample, or parts of feature descriptors from different registration samples that correspond to the same person).

Figure 10:
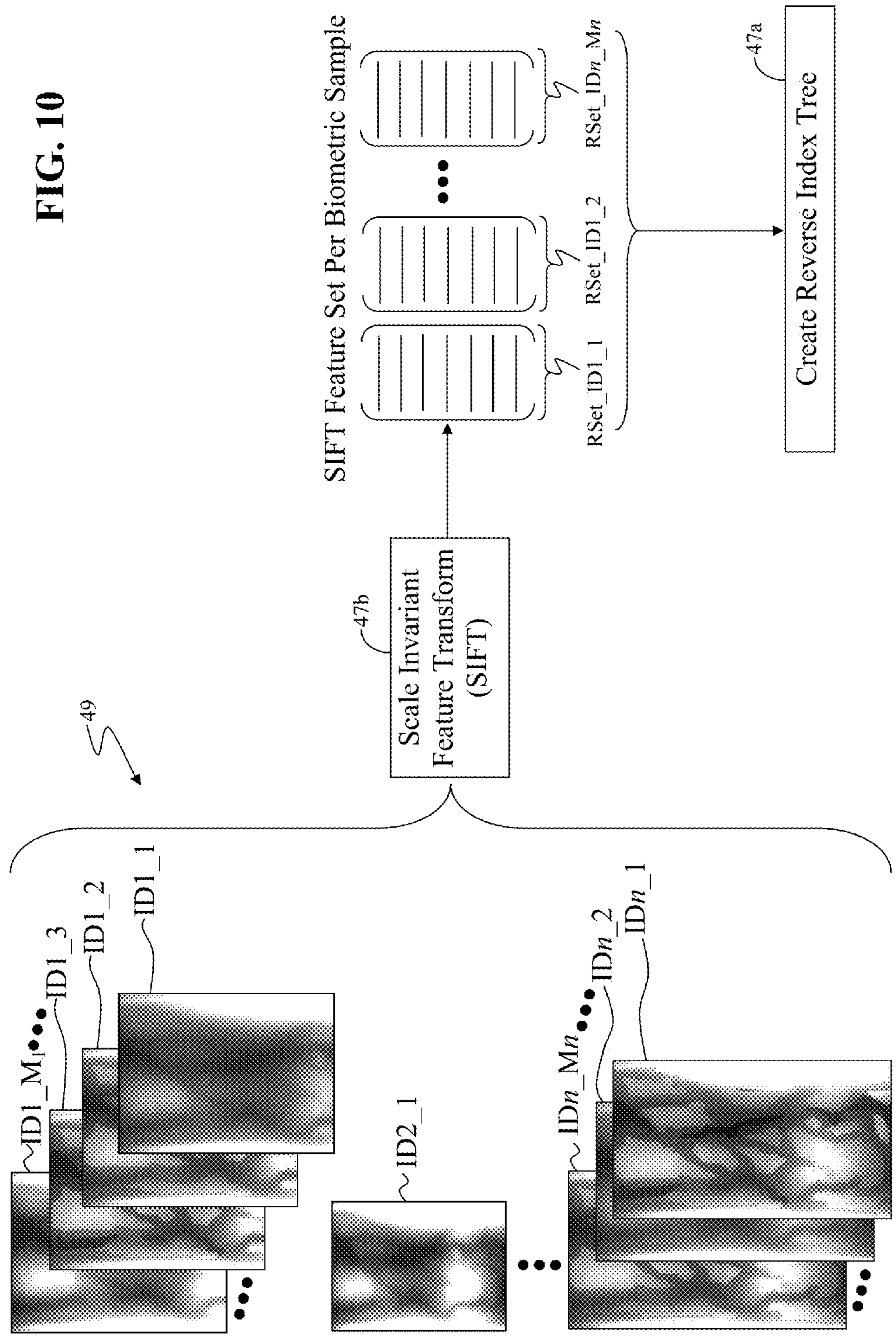
FIG. 10 illustrates the defining/extracting of registration item descriptors from a registration library of registration sample images corresponding to persons that are to be registered.
Figure 11:
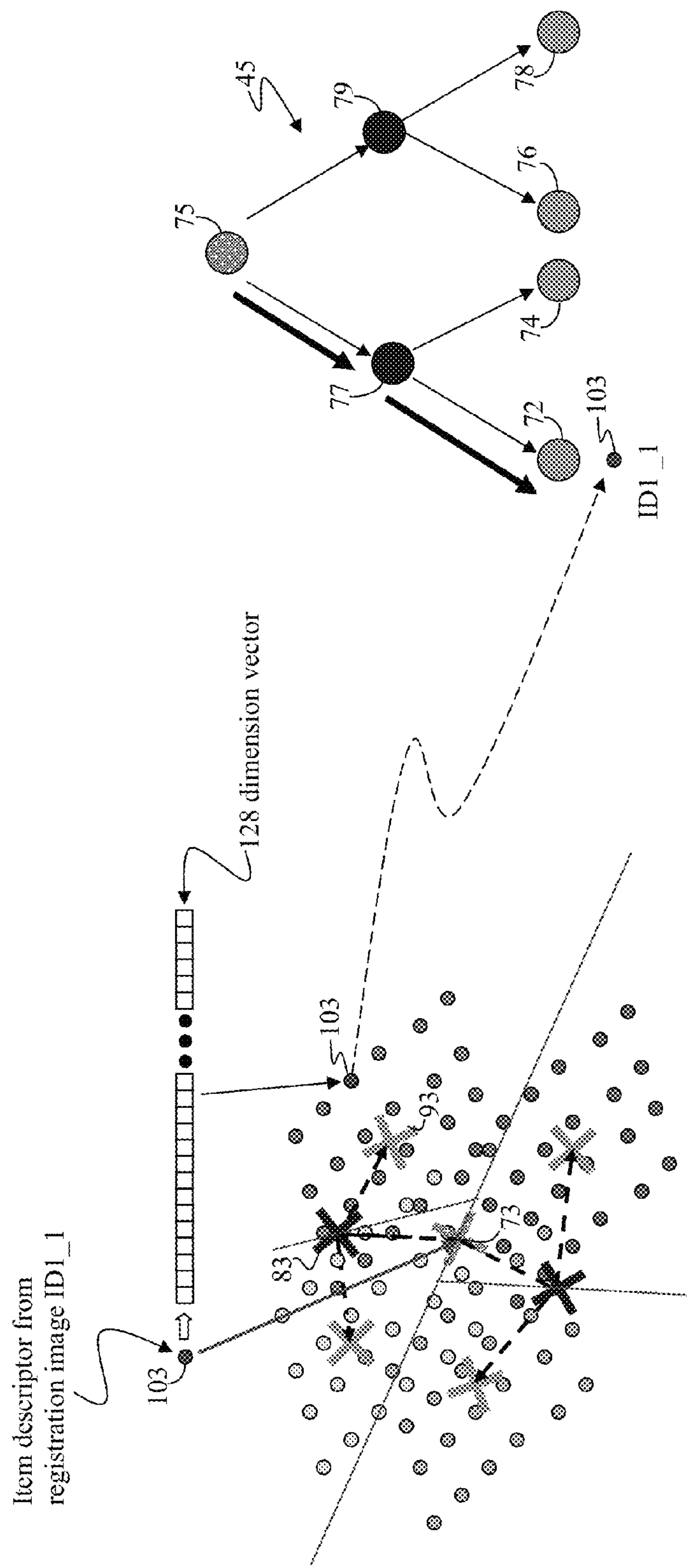
FIGS. 11 and 12 illustrate the distribution of the registration item descriptors of FIG. 10 into the hierarchical tree of FIGS. 7 to 9 to create a reverse index hierarchical tree.
Figure 12:
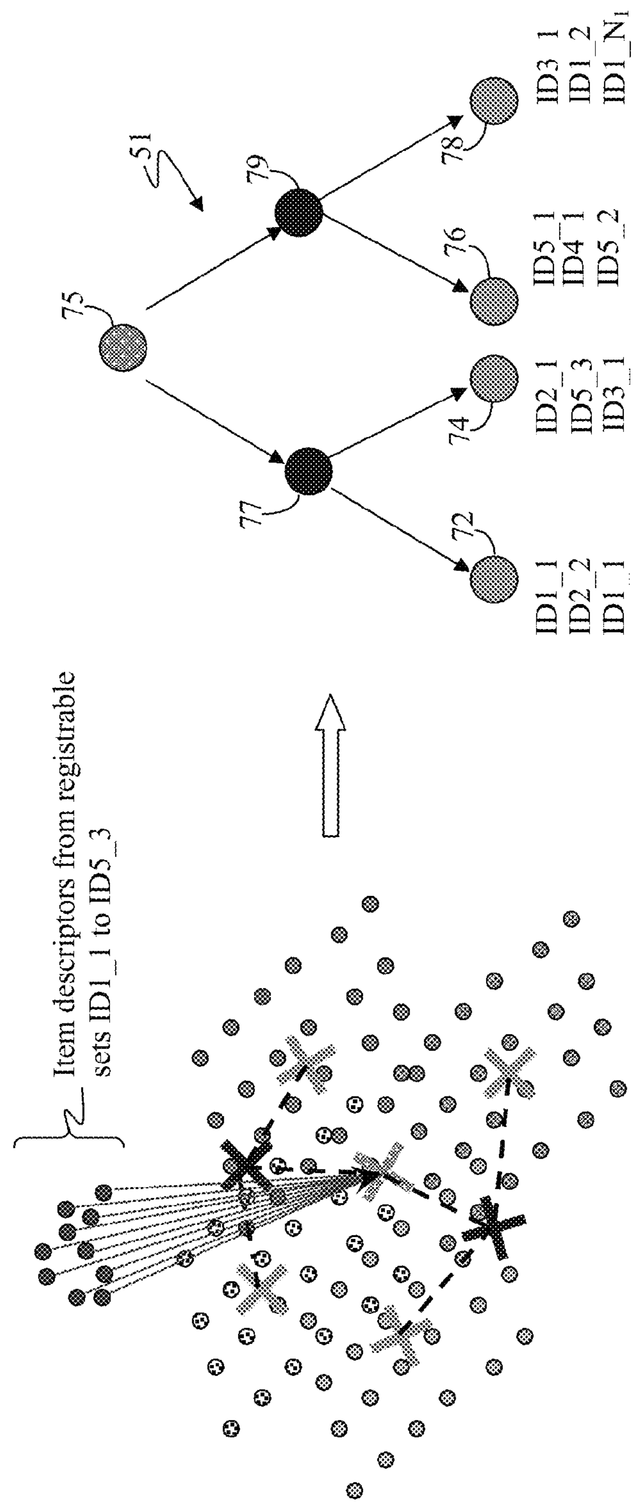

Registration/indexing phase 47 of FIG. 4 is described in more detail in FIGS. 10 to 12. For ease of discussion, the simplified hierarchical tree 45 is used to illustrate the principles of registration/indexing phase 47. Basically, users are registered by recording label information (i.e., ID codes) at leaf nodes that receive any part of an item descriptor from a biometric sample. The label information is preferably the identification (ID) code that identifies (i.e., is indexed to) the biometric sample and to the corresponding registered person from which the biometric sample was obtained.

With reference to FIG. 10, where all elements similar to those of FIG. 5 have similar reference characters and are described above, the biometric registration samples (collectively identified as registration library 49) includes at least one (but preferably more) biometric registration sample per person that is being registered. In the present example, the biometric type is a finger vein map, as is explained above. As before, each of the biometric samples (i.e., registration samples, registration images or registrable item samples) ID1_1 to IDn_Nn are submitted to a characteristic feature identification/extraction application to identify a registration set of item descriptors for each biometric sample. Preferably, registration/indexing phase 47 uses the same type of feature identification application as was used in hierarchical tree construction phase 41. Thus, registration/indexing phase 47 uses a scale-invariant feature transform (SIFT) processing block 47*b*, which outputs a separate registration set of registration item descriptors, RSet_ID_1 to RSset_IDn_Nn, for each of biometric sample, ID1_1 to IDn_Nn, respectively. Preferably, each of the registration sets of item descriptors RSet_ID_1 to RSset_IDn_Nn consists of Z item descriptors.

The registration sets of item descriptors RSet_ID_1 to RSset_IDn_Nn are then submitted to Create Reverse Index Tree block 47*a*, where they are distributed (i.e., clustered) into hierarchical tree 45 to create index hierarchical tree 51. Each leaf node of hierarchical tree 45 that receives any part of a registration set of item descriptors also receiving the ID code (i.e., label) of the registration biometric sample (and person) corresponding to that registration set of item descriptors. Basically, each leaf node represents an undivided group of data, and the ID codes assigned (i.e., indexed) to a leaf indicate the identification of the registered person whose feature descriptor(s) is represented within that leaf node's corresponding group of data. The label information preferably identifies the registration sample's corresponding person. The result of distributing the registration sets of item descriptors RSet_ID_1 to RSset_IDn_Nn into hierarchical tree 45, is reverse index hierarchical tree 51. The principle of this process of populating the leaf nodes of hierarchical tree 45 to construct registered (i.e., index) hierarchical tree 51 is illustrated in FIGS. 11 and 12.

With reference to FIG. 11, item descriptor 103 from biometric sample ID1_1 is distributed into the data cluster that defined hierarchical tree 45. Like before, item descriptor 103 is a 128-dimension vector. In the present example, it is assumed that item descriptor 103 distributes/sorts into the data group defined by center point 93. As is explained above, center point 93 corresponds to leaf node 72. Consequently, item descriptor 103 is distributed to leaf node 72, and leaf node 72 receives (is assigned or indexed to) the ID code (or label or index) of the registration biometric sample to which item descriptor 103 belongs.

For the sake of completeness, FIG. 11 also shows that item descriptor 103 starts at center point 73, which corresponding to root node 75. Its distribution path then goes from center point 73 to the data group defined by center point 83 (corresponding to a path from root node 75 to intermediate node 77), and from center point 83 to the area defined by center point 93 (corresponding to a path from intermediate node 77 to leaf node 72). The distribution path of each item descriptor is preferably defined by similar rules that defined the data cluster of training data (i.e., recursive k-means).

With reference for FIG. 12, the results of distributing 10 item descriptors from five registration sets of item descriptors is illustrated. This results in index hierarchical tree 51, with leaf node ID's of ID1_1 through ID5_3. It is to be understood that a real-world application could have many more registration sets of item descriptors and each set could have hundreds or thousands of item descriptors.

Returning to FIG. 4, with reverse index tree 51 thus complete, processing proceeds to registration sample model creation phase/block 42. Here, a separate registration model is defined for each biometric registration sample. As is stated above, it is not desirable that the original biometric registration samples and their registration sets of feature descriptors be stored since this raises security and computing issues. It is therefore preferred that biometric registration library 49 and any corresponding, individually identified registration sets of feature descriptors be deleted or otherwise destroyed so as to prevent their future use after the blocks 41 and 47 no longer need library 49 (for example after completion of reverse index tree 51).

However, in the presently preferred embodiment, it is till desirable to provide a method of uniquely describing each of the destroyed biometric samples in library 49. This is achieved by making use of the leaf node ID clustering information of each biometric registration sample in the reversed index tree to define a characteristic pattern, histogram or registration model for each biometric registration sample. Basically, each biometric registration sample is assigned a corresponding (histogram-based) registration model that preferably uniquely distinguishes it from the registration models corresponding to the other biometric registration samples. Since the presently preferred embodiment describes the use or finger vein maps as biometric samples, the registration model of each biometric registration samples is preferred termed a "registered vein model" or simply a "registration model". It is to be understood that each registered vein model would uniquely correspond to a biometric registration sample.

In the presently preferred embodiment, each registered vein model is defined by a histogram derived from clustering ID information in the leaf nodes of the reverse index tree 51. Thus, registered sample model creation phase 42 defines a separate histogram for each biometric registration sample. As an illustration, FIG. 4 shows that registered sample model creation phase 42 produces registered vein models RVM_ID1_1 through RVM_IDn_Nn with a one-to-one correspondence to biometric registration samples ID1_1 through IDn_Nn.

Figure 13:
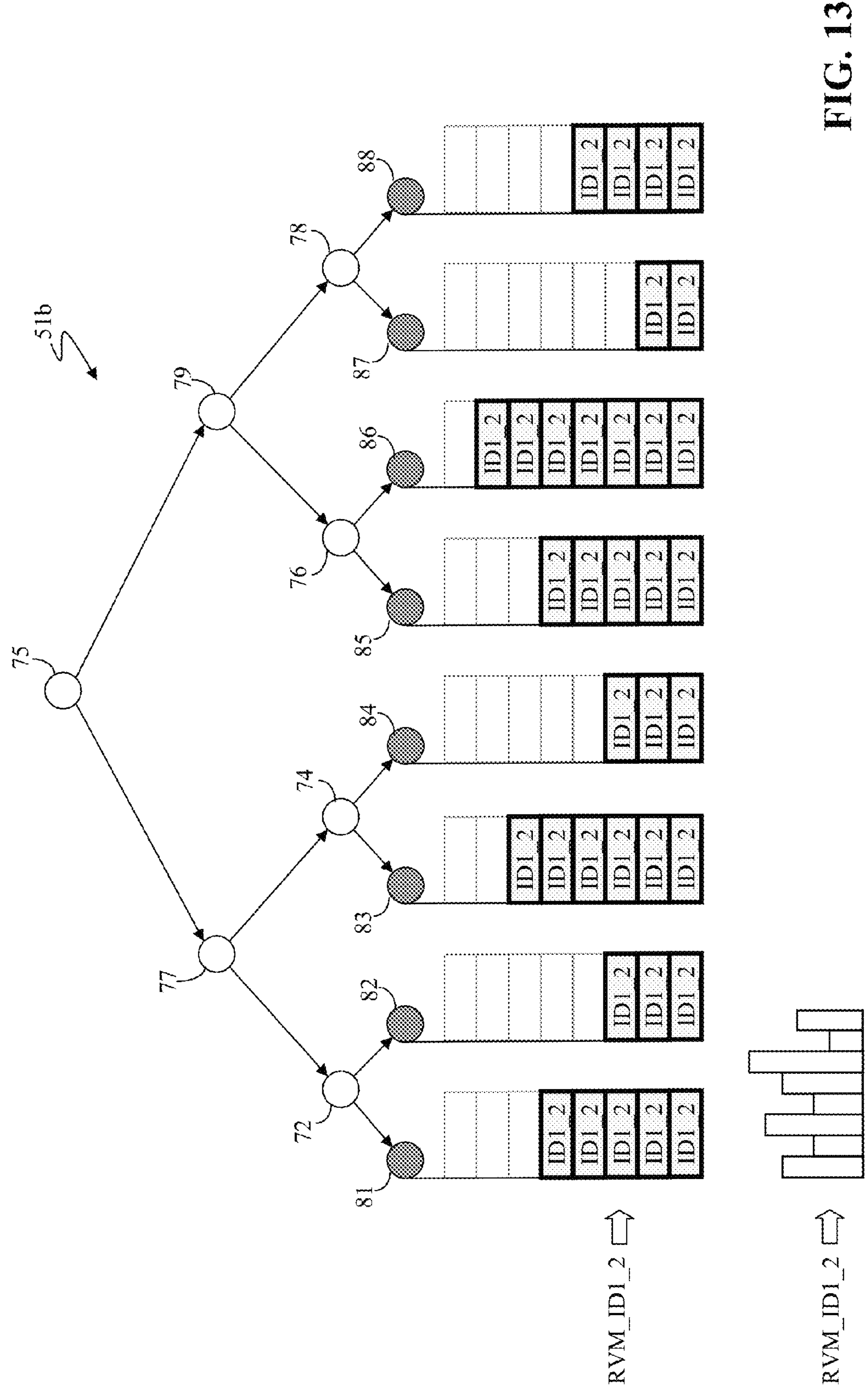
FIG. 13 illustrates the definition of a model (such as a registration model of a query model) based on the clustering of item descriptors at the leaf nodes of a reverse index tree

An illustration of how a registered vein model may be defined is illustrated in FIG. 13. In order to better illustrate this point, reverse index tree 51 is re-represented with an additional level of child nodes and identified as reverse index tree 51*b* FIG. 13. All nodes similar to those of reverse index tree 51 have similar reference characters and are described above. The new level of child nodes results in eight new leaf nodes 81-88. Also for ease of illustration, clustering index information is shown for only biometric registration sample ID1_2. That is, only sample index information is provided for the second biometric registration sample ID1_2 corresponding to person ID1. It is to be understood that each of leaf nodes 81-88 may be indexed to additional biometric registration samples, not shown.

The present registered vein model is based on a simple index count at each leaf node. A preferred method of achieving this is by defining a separate histogram for each biometric registration sample. For example, leaf node 81 is shown to have five registration feature descriptors indexed to biometric registration sample ID1_2, and so the first position of its corresponding histogram would be assigned a value of five. The next leaf node 82 is shown to have three registration feature descriptors indexed to biometric registration sample ID1_2, and so the next position in the histogram is assigned a value of three. This process is repeated for all the leaf nodes to define registered vein model RVM_ID1_2. It is note that the order in which the leaf nodes are assigned to histogram positions is not critical to the present invention, but which ever leaf node order is chosen, that order should be consistent for all vein models. For example, if leaf node 85 were to be assigned to the first position in a histogram for registered vein model RVM_ID1_2, then leaf node 85 would likewise be assigned to the first position of all other vein models, including those created during an authentication phase.

Returning to FIG. 4, with the registered vein models RVM_ID1_1 through RVM_IDn_Nn thus created, one now proceeds to the identification phase 53, where the registration status of an individual is queried to determine if the individual is authenticated and/or recognized as registered. That is, the system is now ready to be used to identify a registered person by submission of a query sample.

For example, a person wishing to be recognized as being pre-registered will submit a query sample 55 (i.e., a new and personal biometric sample of the particular biometric type(s) originally used to register the registrants) to a feature point (i.e., characteristic feature) extraction block 52. Like before, feature point extraction block 52 preferably uses the same characteristic feature extraction method used by registration phase block 47 to identify a query set (i.e., a specific/personal set) of query item descriptors for the query sample. In the present example, feature point extraction block 52 would implement a SIFT feature point extraction application. As before, this SIFT application identifies item descriptors for a given query sample, and each item descriptor preferably includes 128 pieces of descriptive data.

Create query model block 54 then distributes (i.e., clusters) the query set of query item descriptors into reverse index hierarchical tree 51 created by the registration/indexing phase 47 to define a query model (or query histogram) 56 in a manner similar to that used by registration sample model creation phase 42, explained above. Histogram 56 is thus based on the leaf nodes of reverse index tree 51 that receive any part of the query set of query item descriptors, and the number of query item descriptors that are represented in each leaf node.

Query model 54 is then passed on to hypothesis voting block 53*a* of identification phase 53. Hypothesis voting block 53*a* compares query model 56 with all the registered models defined by registered sample model creation phase 52, and identifies the registrant that renders the highest confidence of matching the person that submitted the query sample. That is, it identities the register model or registered model mixtures that most closely match query model 56 to identify a potential candidate match (i.e., the target ID).

However, because hypothesis voting block 53*a* always identifies a target ID (i.e., a potential candidate, or registrant, match), hypothesis voting block 53*a* will issue a target ID code even if the query sample 55 is from a person that is not pre-registered. Therefore, the target ID code (i.e., the potentially ID'ed registrant) selected from among the registered samples is preferably submitted to a model confidence block 53*b*.

Model confidence block 53*b* then assigns a second confidence level to the identified candidate match. It is to be understood that blocks 53*a* and 53*b* may define confidence differently and use different formulations for determining their respective confidence levels.

As is explained before, a registrant may submit multiple biometric samples for registration, and so query model 56 may share similarities with more than one registered model. The confidence level provided by model confidence block 53*b* takes into account the possibility that query model 54 may be close to a space between multiple registered models corresponding to the same registrant. Basically, if query model 54 share similarities with multiple register models that correspond to the same potential candidate match, the confidence level of true match having been found may be raised. Based on the determined confidence level, the person wanting to be recognized as being pre-registered will either be assigned a "rejection" status and be rejected as not matching a registrant within the registry, or be assigned a "recognition" status indicating that the person may be a probable match but could not be authenticated (or may match any registrant but the matching registrant could not identified), or be assigned an "authentication" status indicating that the person is authenticated as actually being a specific registrant within the register.

One embodiment of an authentication process illustrated by blocks 52 to 55 is described in reference to FIG. 14.

With reference to FIG. 14, a Query sample 55 (i.e., the specific biometric item of the given biometric item class) of a person wishing to be recognized as being pre-registered is received. In deployed systems, the IR camera sensor may be smaller than the finger resulting in only a partial vein image for querying. Thus, query sample 55 is shown to cover a smaller area than those of library 49.

Feature point extraction block 52 implements a feature identification method, such as used in the SIFT algorithm, to identify a query set (i.e., a specific set) of query item descriptors (QSet) for query sample 55. Like before, each query item descriptor preferably includes 128 pieces of descriptive data. QSet is then submitted to Create Test Model Histogram block 54, which as illustrated by block 54*a* distributes the item descriptors within query set QSet into reveres index hierarchical tree 51 according to the relations in the item descriptors established in the creation of hierarchical tree 45. That is, the query set of query item descriptors are preferably distributed using the same data clustering technique used by hierarchical tree construction phase 41.

Each leaf node that receives an item descriptor from Query set QSet, provides a vote per any part of QSet that resides within it, as determined by the assigned ID code (or label). Block 54*b* then defines a query model based on the number of label votes found at each leaf node in a manner similar to that illustrated in FIG. 13. Thus, the query model preferably takes the form of a histogram.

Before continuing, it should be noted that, as is explained above, each registration image is represented by a corresponding registration model, which preferably a histogram of how that registration model's corresponding registration feature descriptors are clustered in the leaf nodes of the reverse index tree. Additionally, if a registrant provided more than one biometric registration sample, then that registrant can be represented by a registrant model (or finger model since finger vein maps are the biometric class being used in the present example) that is defined by a Gaussian mixture of all of that registrant's corresponding registration models. In the special case where each registrant provides only a single biometric registration sample and thus corresponds to only one registration model, then the registration models and the registrant models (i.e., finger models) may be the same.

In block 53*a*, the query model is compared to all the stored registered vein models (RVM_ID1_1 through RVM_IDn_Nn) and/or Gausian mixtures of the registered vein models (i.e., finger models). As is explained above, each registered vein model provides a characteristic description of its corresponding biometric registration sample. Block 53*a* then identifies the registered person (i.e., registrant) whose corresponding registered vein model(s) and/or finger model is/are most similar to the query model, and block 53*b* assigns a confidence (i.e., probability) level to that registered person. This would be the potential candidate match. That is, block 53*b* assigns a probability value of the potential candidate match truly matching to the same person that corresponds to the query model.

In block 58, this confidence value is compared with a second threshold of preferably 99%. If the confidence value is not less than this second threshold (output is YES), then the potential candidate match is recognized and authenticated as matching the person that submitted the query sample, as illustrated by block 60. However, if the result of this comparison is NO, then block 62 checks if the confidence level is not lower than a first threshold, which is lower than the second threshold. If the confidence level is lower than the second threshold (output is YES), then the potential candidate match is rejected and not recognized or authenticated, as indicated by block 64. At this stage, block 58 has already determined that the confidence level is lower than the second threshold, but if block 62 determines that the confidence level is not lower than the first threshold (output of block 62=NO), then the potential candidate person is categorized as recognized but not authenticated, as indicated by block 66. A range is thereby defined between the first and second threshold levels where the potential candidate match may be recognized but not authenticated. Preferably, this first threshold is 95%.

Figure 15:
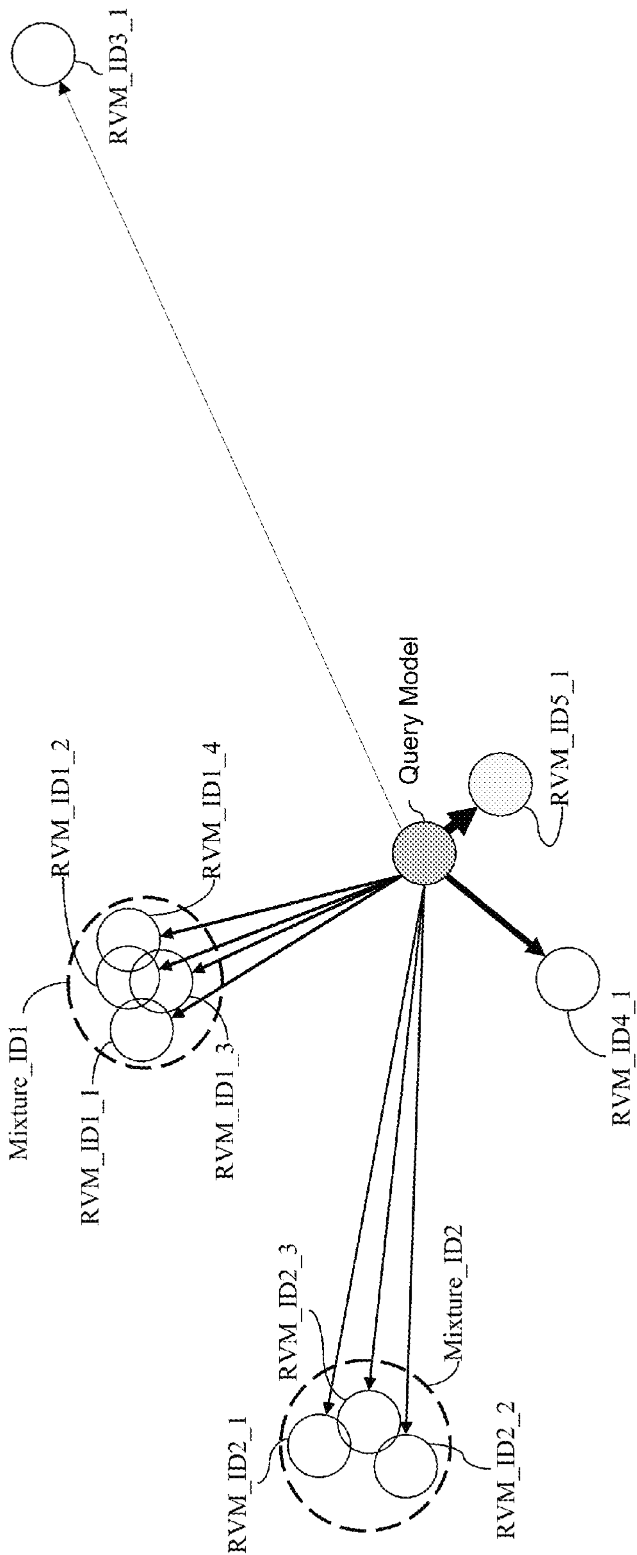
FIG. 15 illustrates the separation of Gaussian mixtures of registration models and a query model within a comparison space.
Figure 16:
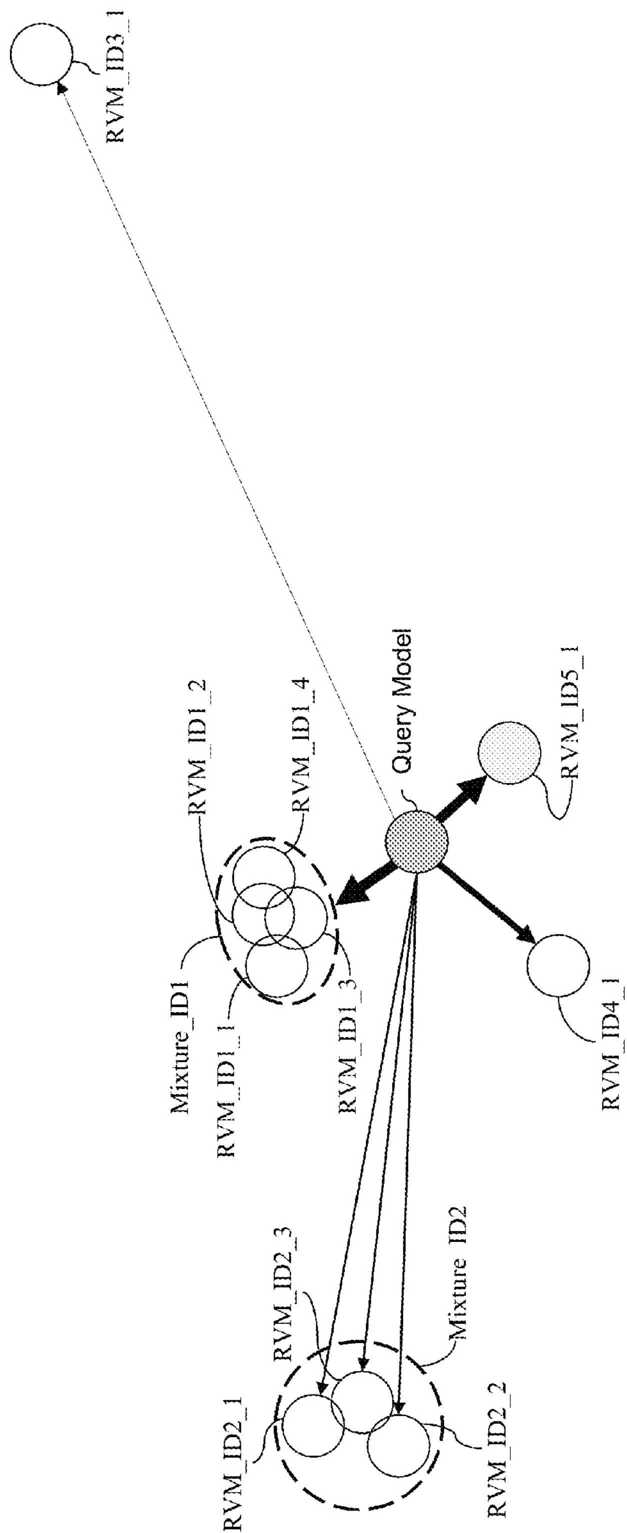
FIG. 16 illustrates how Gaussian mixtures of registration models affect the confidence of selecting a registrant from among a registry of registrants.

Examples of how confidence levels may be assigned are illustrated in reference to FIGS. 15 and 16.

With reference to FIG. 15, the query model and the registered vein models are preferably defined by histograms. Some of these histograms (i.e., the query model and registered vein models RVM_ID1_1 through RVM_ID5_1) are shown distributed within a comparison space. The objective is to assign a histogram confidence level to each (or mixture of) registered vein model(s) based on the probability of its corresponding registrant being the same person that submitted the query sample on which the query model is based. As is explained above, although library 49 may have been deleted, a histogram of each biometric registration sample image in library 49 was previously generated and saved as a registered vein model. During the identification phase, the histogram generated by the query sample image (i.e., the query model) is compared to each registered vein model to determine how closely they match. The registrant whose registered vein model(s) most closely match the query model may be deemed the potential candidate match (or the recognized ID if no rejection option is available). If a rejection option is available, then the potential candidate match is recognized only if this confidence level is not lower than a predefined first threshold.

Authenticating the recognized potential candidate match may be achieved by comparing this confidence level to a predefined second threshold. But authentication may optionally require augmenting this confidence level by taking into account the finger models (i.e., the Gaussian mixtures of register models corresponding to the same registrant) prior to comparing it to the predefined second threshold.

In the pictorial illustration of FIG. 15, the physical displacement between the registered vein models is analogous to the similarity level between histograms. As shown, some registrants may have multiple registered vein models associated with them, which can be defined by a Gaussian mixture. For example, registrant ID1 has four corresponding registered vein models (RVM_ID1_1 through RVM_ID1_4), as is symbolically illustrated by dotted circle Mixture_ID1. This Mixture_ID1 would define a finger model (or registrant model) for registrant ID1 based on a Gaussian mixture of registered vein models RVM_ID1_1 through RVM_ID1_4. Similarly, Registrant ID2 has three corresponding registered vein models (RVM_ID2_1 through RVM_ID1_3), as symbolically illustrated by finger model Mixture_ID2.

In FIG. 15, the query model is being compared with the registered vein models. Arrows symbolize the distance (in similarity) between the registered vein models and the query models. For illustration purposes, registered vein models that more closely match the query model are given thicker arrows. In the present example, registered vein model RV_ID5_1 most closely matches the query model, and it may therefore be deemed the potential candidate match, such as would be determined by box 53*a* of FIG. 14. That is, registrant ID5, which corresponds to registered vein model RV_ID5_1, is deemed the potential match for the person who submitted the query sample on which the query model is based.

If a registrant corresponds to multiple registered vein models, however, then the probabilities of these multiple registered vein models can be combined to create a mixture model. Preferably, the multiple registered vein models are combined using a Gaussian mixture, and the query model may be compared to the Gaussian mixtures. An illustration of this is shown in FIG. 16, where all elements similar to those of FIG. 15 have similar reference characters and described above.

In FIG. 16, Mixture_ID1 is illustrated to have a similar similarity distance to the query model as registered vein model RVM_ID5_1, but because Mixture_ID_1 represents multiple registered vein models, it is given a higher probability of being a match for the query model, and registrant ID1, which correspond to Mixture_ID_1, is deemed the potential candidate match. A confidence level can then be determined for registrant ID1 for comparison with the first predefined threshold and/or the second predefined threshold.

Figure 17:
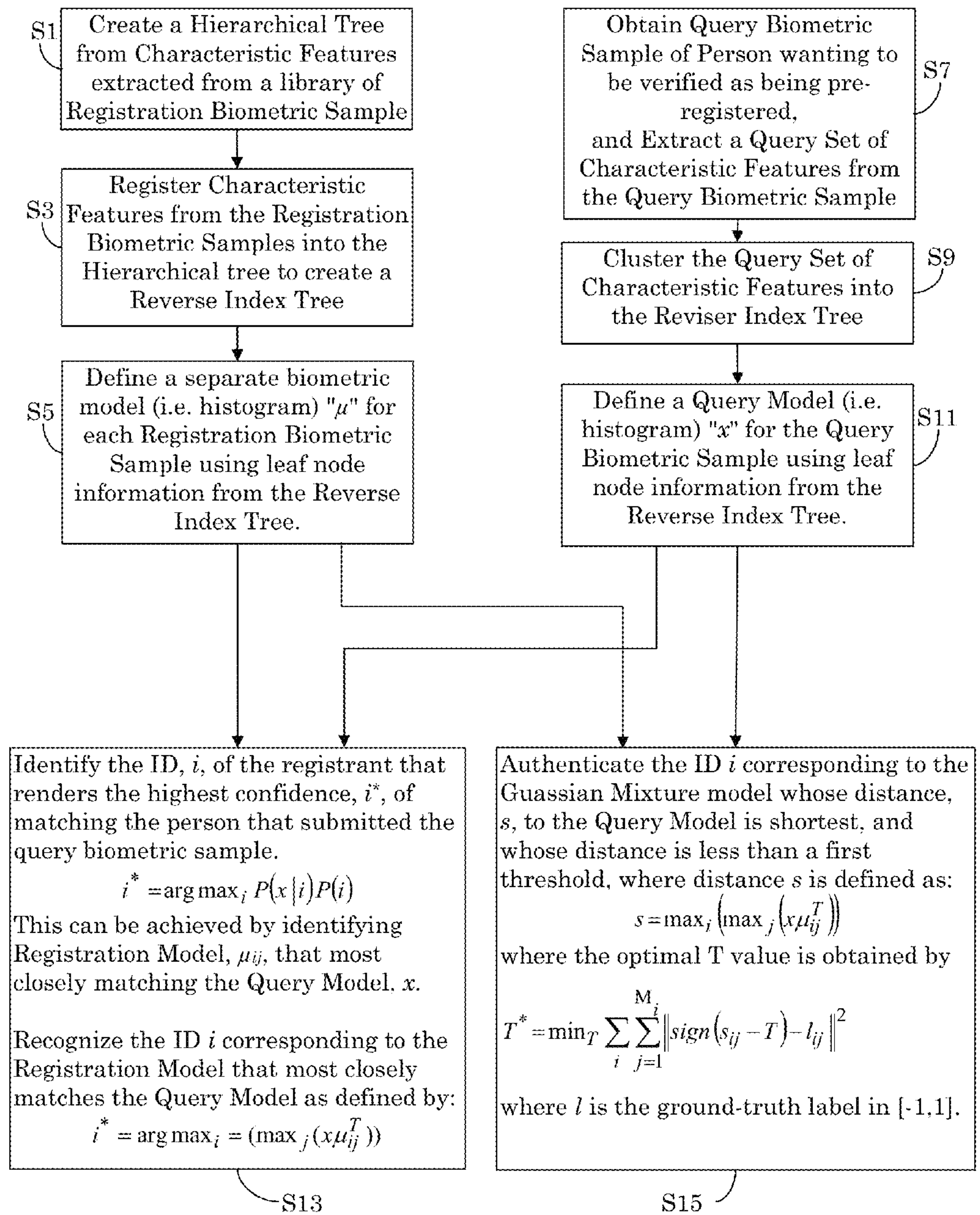
FIG. 17 is a process flow summary of a preferred embodiment of the present invention.

Another overview of a preferred embodiment for how confidence levels are determined and the potential candidate match is identified for recognition and authenticated is illustrated in FIG. 17.

Steps S1 through S5 prepare the registration tools for recognizing/authenticating an individual who wants to be recognized as being pre-registered. As is explained above, a first step is to collect a registration library of biometric registration samples from all individuals who are to be registered. In step S1, a hierarchical tree is created from characteristic features (i.e., registration feature points) extracted from the registration library. Following creation of the hierarchical tree, step S3 creates a reverse index tree by clustering and registering the characteristic features from the biometric registration samples of the registration library into the hierarchical tree, which adds an ID list correlating feature point clustering information at each leaf node to its corresponding biometric registration sample and thereby to its corresponding registrant. Step S5 then defines a separate registration model (i.e., histogram) "μ" for each biometric registration sample in the registration library using the ID list information at each leaf node of the reverse index tree. The collection of created registration models μ are stored, and the registration library and its corresponding sets of extracted characteristic features may now be destroyed. The system is now ready to receive a biometric query sample from anyone wishing to be recognized as a registrant.

Steps S7 to S9 describe receiving and preparing a biometric query sample for recognition testing. In step S7, a biometric query sample of person wanting to be verified as being preregistered is received/accessed, and a query set of characteristic features (query feature points) is extracted from the biometric query sample. Step S9 then clusters the query set of characteristic features into the reviser index tree created in step S3. Step S11 then defines a query model (i.e., histogram) "x" using clustering information of the query feature points at each leaf node of the reverse index tree in a manner analogous to that used by step S5 to create the registered models.

Step S13 then determines registration status by comparing the query model to the collection of registered models. The objective is to identify the registrant ID, i, that renders the highest confidence i* of matching the person that provided the biometric query sample. This confidence may be defined as:

$i^*=\arg\max_i P(x|i)P(i)$

To address this question, it is first observed that some registrants may have provided more than one biometric registration sample, and thus may be associated with multiple biometric registration samples. If a registrant i (i.e., a finger ID in the present example) provided multiple biometric registration samples, $M_i$, then his/her biometric registration samples (i.e., finger vein patterns) can be described using a Gaussian mixture model, as follows:

$P(x|i)\sim\{w_{ij},N(x|\mu_{ij},\sigma_{ij}^2)\}\ \forall j=1,\ldots M_i$

Where N is the normal distribution, σ is the variance, and $w_{ij}=1/M_i$. For simplicity, it is assumed that $w_{ij}=1/M_i$ is a constant and σ is also a constant. Therefore, a finger model (i.e., register model) need only store multiple histograms $\mu_{ij}$. Thus, the confidence level can be determined using only the histograms (i.e., the registered models) and the query model x. The objective therefore becomes to identify the registered model that most closely matches the query model x.

In practice, the this maximum a posteriori estimate (MAP) can be obtained by:

$i^*=\arg\max_i(\min_j\|x-\mu_{ij}\|^2)$

Norm $\mu x-\mu_{ij}\|^2$ is a measure of the distance between query model x and registered model $\mu_{ij}$. Alternatively by matrix manipulation and by making using the matrix transpose of μ, the above MAP can be more simply obtained by:

$i^*=\arg\max_i(\max_j(x\mu_{ij}^T))$

The ID i identified by i* is deemed a potential candidate match, and it may be recognized as corresponding to the person that submitted the query biometric sample is i* is greater than a pre-defined threshold.

Step S15 provides an authentication step to more surely identify the person that submitted the query biometric sample. The presently preferred method first assumes that the query model x matches one of the finger models (i.e., Gaussian mixtures, which may be comprised of one or more registration models). Therefore the confidence to authenticate x may be defined as:

$$P_{auth}(x)=\sum_i\sum_{j=1}^{M_i}P(i)w_{ij}N(x\mid\mu_{ij},\sigma_{ij}^2)$$

Experimentation has shown that x is either very close to one of the Gaussian mixtures models, or is far away from any mixture. Hence the closest distance between x and any Gaussian mixture model can be used to derive the confidence, as:

$$P_{auth}(x)\triangleq\max_{ij}(P(i)w_{ij}N(x\mid\mu_{ij},\sigma_{ij}^2))$$

Since P(i) is the same between ID's, and since $w_{ij}$ and $\sigma_{ij}^2$ are both constant, the above can be simplified as:

$P\text{auth}(x)\propto\min_i(\min_j\|x-\mu_{ij}\|^2)$

Therefore, $s=\min_i(\min_j\|x-\mu_{ij}\|^2)$ can be used as the confidence score. Preferably, computation of s is simplified as:

$s=\max_i(\max_j(x\mu_{ij}^T))$ where the optimal T value (i.e., T*) can be obtained by $$T^*=\min_T\sum_i\sum_{j=1}^{M_i}\|\text{sign}(s_{ij}-T)-l_{ij}\|^2$$

where l is the ground-truth label in [−1,1].

Figure 18:
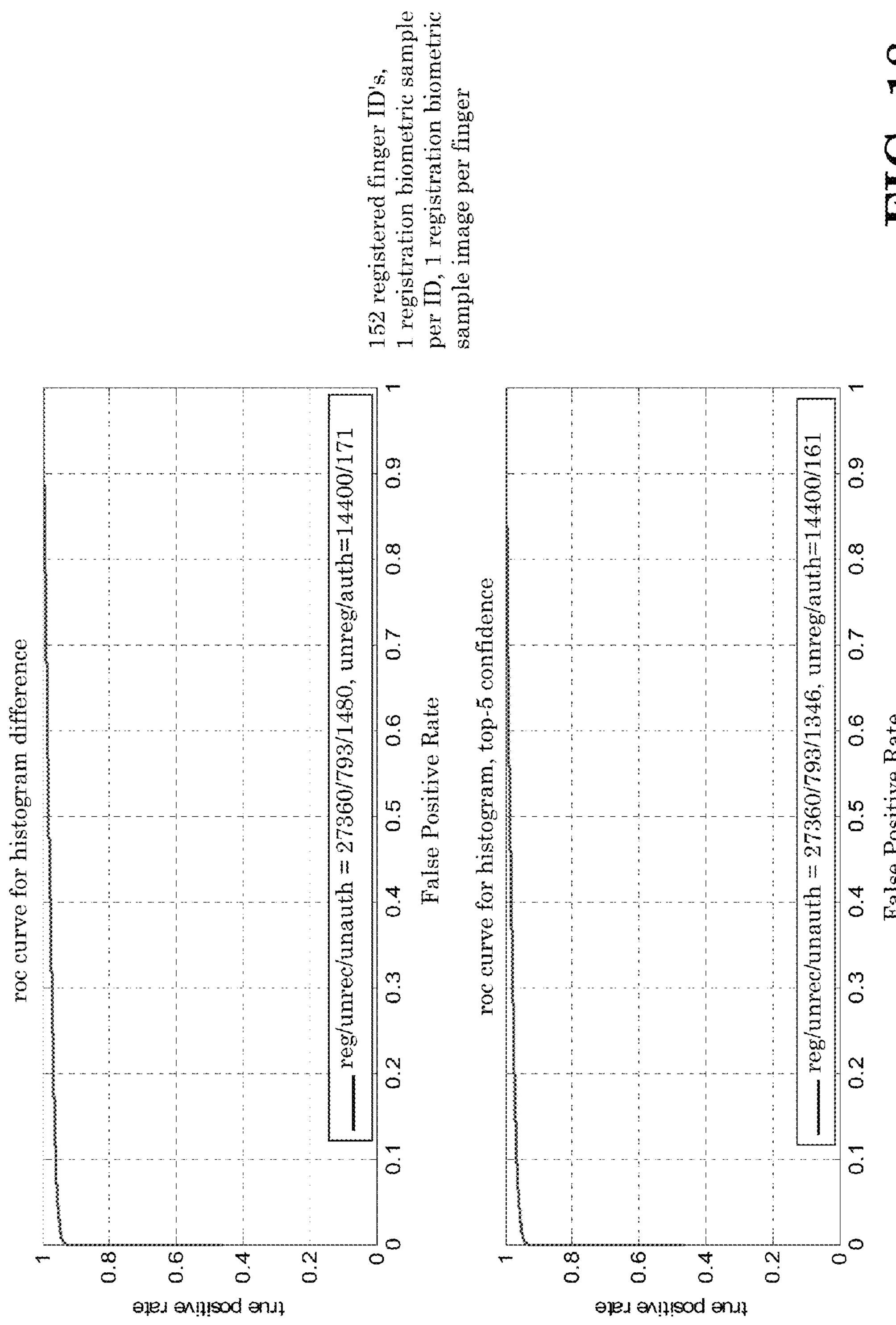
FIGS. 18 and 19 provide some experimental results obtained with the present invention.
Figure 19:
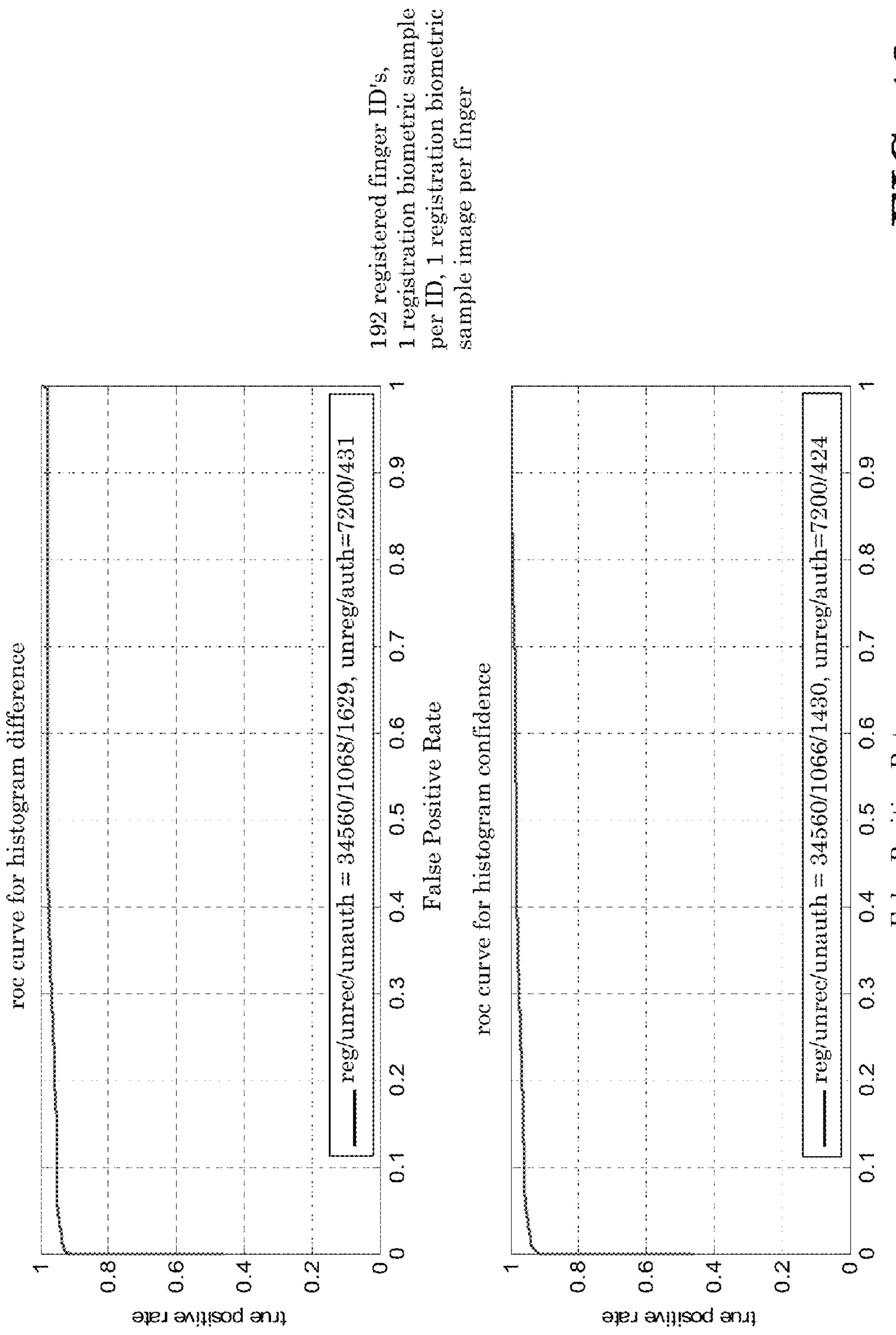

FIGS. 18 and 19 provide some experimental results. FIG. 18, illustrates results obtained in a registration verification system implementing the above method, and using 152 registered finger ID's, 1 biometric registration sample per ID, and 1 biometric registration sample image per finger. The roc curve for histogram difference in a true positive rate versus false positive rate graph is shown in the top graph in FIG. 18. The registered/unrecognized/unauthenticated results were 27360/793/1480. The unregistered/authenticated results were 14400/171. The roc curve for histogram for the top-5 confidence in a true positive rate versus false positive rate graph is shown in the lower graph in FIG. 18. The registered/unrecognized/unauthenticated results were 27360/793/1346. The unregistered/authenticated results were 14400/161.

FIG. 19, illustrates results obtained in a registration verification system implementing the above method, and using 192 registered finger ID's, 1 biometric registration sample per ID, and 1 biometric registration sample image per finger. The roc curve for histogram difference in a true positive rate versus false positive rate graph is shown in the upper graph in FIG. 19. The registered/unrecognized/unauthenticated results were 34560/1068/1629. The unregistered/authenticated results were 7200/431. A roc curve for histogram confidence in a true positive rate versus false positive rate graph is shown in the lower graph in FIG. 18. The registered/unrecognized/unauthenticated results were 34560/1066/1430. The unregistered/authenticated results were 7200/424.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of searching for a query object within an object class, said method comprising:

(a) accessing a collection of unique training samples of multiple training objects within said object class;

(b) defining a separate training set of training item descriptors from each of said training samples;

(c) extracting the training item descriptors from the separate training sets into a single composite collection of individual training item descriptors;

(d) creating a hierarchical tree from said composite collection of individual training item descriptors according to relations in the individual training item descriptors, said hierarchical tree having a plurality of leaf nodes;

(e) accessing registration sets of registration item descriptors, each registration set being defined from a respective registration sample obtained from a registration objects to be registered, said registration object being of said object class, individually distributing each registration item descriptor from each registration set into said hierarchical tree according to said relations defined in the creation of said hierarchical tree, indexing the registration item descriptors clustered within each leaf node to their corresponding registration samples;

(f) defining a separate registration model for each registration sample based on the clustering of its corresponding registration item descriptors in each leaf node;

(g) accessing a query sample from said query object, defining a query set of query item descriptors from said query sample, individually distributing each query item descriptor into said hierarchical tree according to said relations defined in the creation of said hierarchical tree;

(h) defining a query model for said query sample based on the clustering of said query item descriptors in each leaf node; and (i) using the query model, x, and the registration models to identify as a potential candidate match the registration object, i, that renders the highest confidence i* of matching the query object, defined as $i^*=\arg\max_i P(x|i)P(i)$.

2. The method of claim 1, wherein in step (i), the registration object whose corresponding register model is deemed to most closely match the query model is identified as said potential candidate match.

3. The method of claim 1, wherein in step (d), said hierarchical tree is a binary tree.

4. The method of claim 1, wherein the collection of unique training samples are taken from a general population of the object class, and the registration samples are not included in the collection of unique training samples.

5. The method of claim 1, wherein in step (e), said registration samples are said training sample, and registration item descriptors are different from said training item descriptors.

6. The method of claim 1, wherein in step (e), said registration item descriptors are different from said training item descriptors, said registration samples are different from said training samples and said registration objects are different from said training objects.

7. The method of claim 1, wherein in step (e), multiple registration samples are obtained from the same registration object in a many-to-one manner.

8. The method of claim 1, wherein in step (f), each registration model uniquely identifies its corresponding registration sample.

9. The method of claim 1, wherein in step (f), each registration model is a histogram the numbers of its corresponding registration item descriptors in each leaf node.

10. The method of claim 1, wherein in step (h), said query model is defined in a manner analogous to how said registration models are defined.

11. The method of claim 1, wherein in step (i),

IF a measure of the similarity between the query model and a Gaussian mixture of the registration models that correspond to the potential candidate match is greater than a first threshold, THEN said query object is deemed to be registered and correspond to any one of the registration objects.

12. The method of claim 11, wherein in step (i),

IF said measure of the similarity is further greater than a second threshold higher than said first threshold, THEN said query object is deemed to be authenticated and specifically correspond to the potential candidate match.

13. The method of claim 11, wherein in step (i),

IF said measure of the similarity is not greater than said first threshold, then said query object is rejected as not corresponding any registration object.

14. The method of claim 1, wherein,

IF i* is greater than a first threshold, THEN said query object is deemed to be registered and correspond to any one of the registration objects.

15. The method of claim 1, implemented in a registration verification system having at least one data processing unit configured to execute steps (a) through (i).

16. The method of claim 1, further including destroying said training samples and said training sets of training item descriptors.

17. The method of claim 1, wherein said object class is a human person, and said training samples, registration samples and query samples are biometric samples of a human person.

18. A method of searching for a query object within an object class, said method comprising:

(a) accessing a collection of unique training samples of multiple training objects within said object class;

(b) defining a separate training set of training item descriptors from each of said training samples;

(c) creating a composite collection of training item descriptors from the separate training sets of sample item descriptors;

(d) creating a hierarchical tree from said composite collection of training item descriptors according to relations in the training item descriptors, said hierarchical tree having a plurality of leaf nodes;

(e) accessing registration sets of registration item descriptors defined from respective registration samples obtained from registration objects of said object class, distributing said registration sets of registration item descriptors into said hierarchical tree according to said relations defined in the creation of said hierarchical tree, indexing the registration item descriptors clustered within each leaf node to their corresponding registration samples;

(f) defining a separate registration model for each registration sample based on the clustering of its corresponding registration item descriptors in each leaf node;

(g) accessing a query sample from said query object, defining a query set of query item descriptors from said query sample, distributing said query set of query item descriptors into said hierarchical tree according to said relations defined in the creation of said hierarchical tree;

(h) defining a query model for said query sample based on the clustering of said query item descriptors in each leaf node; and (i) using the query model, x, and the registration models to identify as a potential candidate match the registration object, i, that renders the highest confidence i* of matching the query object, defined as $i^*=\arg\max_i P(x|i)P(i)$;

wherein in step (i):

each registration object i corresponds to $M_i$ registration models;

said query model and said registration models are in matrix form;

the registration models are denoted $\mu_{ij}$ where i specifies a registration model's corresponding registration object and j identifies a specific one of the multiple registration models $1-M_i$ that correspond to registration object i;

the registration samples that corresponds to the same registration object are described by a Gaussian mixture model, as follows:

$$P(x|i)\sim\{w_{ij},N(x|\mu_{ij},\sigma_{ij}^2)\}\forall j=1,\ldots M_i$$

where N is the normal distribution, σ is the variance, and $w_{ij}=1/M_i$; and the registration object i whose corresponding confidence i* satisfies the relationship $i^*=\arg\max_i=(\max_j(x\mu_{ij}^T))$ is deemed said potential candidate match.

19. A method of searching for a query object within an object class, said method comprising:

(a) accessing a collection of unique training samples of multiple training objects within said object class;

(b) defining a separate training set of training item descriptors from each of said training samples;

(c) creating a composite collection of training item descriptors from the separate training sets of sample item descriptors;

(d) creating a hierarchical tree from said composite collection of training item descriptors according to relations in the training item descriptors, said hierarchical tree having a plurality of leaf nodes;

(e) accessing registration sets of registration item descriptors defined from respective registration samples obtained from registration objects of said object class, distributing said registration sets of registration item descriptors into said hierarchical tree according to said relations defined in the creation of said hierarchical tree, indexing the registration item descriptors clustered within each leaf node to their corresponding registration samples;

(f) defining a separate registration model for each registration sample based on the clustering of its corresponding registration item descriptors in each leaf node;

(g) accessing a query sample from said query object, defining a query set of query item descriptors from said query sample, distributing said query set of query item descriptors into said hierarchical tree according to said relations defined in the creation of said hierarchical tree;

(h) defining a query model for said query sample based on the clustering of said query item descriptors in each leaf node; and (i) using the query model, x, and the registration models to identify as a potential candidate match the registration object, i, that renders the highest confidence i* of matching the query object, defined as $i^*=\arg\max_i P(x|i)P(i)$;

wherein for each registration object, a Gaussian mixture is defined for all its corresponding registration models, and an authentication confidence s is defined as $$s=\max_i(\max_j(x\mu_{ij}^T))$$

where $\mu_{ij}$ denotes the registration models, i specifies a registration model's corresponding registration object, j identifies a specific one of the multiple registration models that correspond to registration object i, and T is the transform operator; and IF s is greater than a predefined threshold of confidence greater than i*, THEN said query object is deemed to be authenticated and specifically correspond to the potential candidate match.

20. The method of claim 19, wherein an optimal value of T is defined as $$T^* = \min_T \sum_i \sum_{j=1}^{M_i} \|\text{sign}(s_{ij} - T) - l_{ij}\|^2$$

where l is the ground-truth label in [−1,1].

* * * * *